US010855569B2

(12) United States Patent
Mihelic et al.

(10) Patent No.: US 10,855,569 B2
(45) Date of Patent: *Dec. 1, 2020

(54) DISTRIBUTED RADIO TRANSPARENT CLOCK OVER A WIRELESS NETWORK

(71) Applicant: Aviat U.S., Inc., Austin, TX (US)

(72) Inventors: Janez Mihelic, Ljubljana (SI); Tadej Markovic, Ljubljana (SI)

(73) Assignee: Aviat U.S., Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,747

(22) Filed: Sep. 10, 2019

(65) Prior Publication Data

US 2020/0007424 A1    Jan. 2, 2020

Related U.S. Application Data

(63) Continuation of application No. 16/046,948, filed on Jul. 26, 2018, now Pat. No. 10,411,986.

(Continued)

(51) Int. Cl.
*H04L 12/26* (2006.01)
*H04L 12/855* (2013.01)
*H04L 27/26* (2006.01)
*H04J 3/06* (2006.01)
*H04W 56/00* (2009.01)

(52) U.S. Cl.
CPC .......... *H04L 43/106* (2013.01); *H04J 3/0667* (2013.01); *H04J 3/0673* (2013.01); *H04J 3/0697* (2013.01); *H04L 27/2657* (2013.01); *H04L 47/2466* (2013.01);

(Continued)

(58) Field of Classification Search
None
See application file for complete search history.

(56) References Cited

U.S. PATENT DOCUMENTS

2005/0018762 A1    1/2005   Aiello et al.
2010/0020829 A1    1/2010   Ruffini
(Continued)

OTHER PUBLICATIONS

International Application No. PCT/US2018/043982, International Search Report and Written Opinion dated Oct 15, 2018.

(Continued)

*Primary Examiner* — Brian S Roberts
(74) *Attorney, Agent, or Firm* — Sheppard, Mullin, Richter & Hampton, LLP

(57) ABSTRACT

An example method comprises receiving, by a first PHY of a first transceiver, a timing packet, timestamping, by the first transceiver, the timing packet and providing the timing packet to a first intermediate node, determining a first offset between the first intermediate node and the first transceiver, updating a first field within the timing packet with the first offset between the first intermediate node and the first transceiver, the offset being in the direction of the second transceiver, receiving the timing packet by a second transceiver, the timing packet including the first field, information within the first field being at least based on the first offset, determining a second offset between the second transceiver and an intermediate node that provided the timing packet to the second transceiver and correcting a time of the second transceiver based on the information within the first field and the second offset.

21 Claims, 10 Drawing Sheets

Related U.S. Application Data

(60) Provisional application No. 62/537,375, filed on Jul. 26, 2017.

(52) U.S. Cl.
CPC ......... *H04W 56/00* (2013.01); *H04W 56/001* (2013.01); *H04L 43/0852* (2013.01)

(56) References Cited

U.S. PATENT DOCUMENTS

| | | | |
|---|---|---|---|
| 2010/0085989 A1* | 4/2010 | Belhadj | H04J 3/0667 370/503 |
| 2010/0115047 A1 | 5/2010 | Briscoe et al. | |
| 2010/0135334 A1 | 6/2010 | Briscoe et al. | |
| 2011/0153869 A1 | 6/2011 | Bryant | |
| 2011/0296226 A1 | 12/2011 | Sorbara et al. | |
| 2012/0014377 A1* | 1/2012 | Joergensen | H04L 43/106 370/352 |
| 2013/0034197 A1 | 2/2013 | Aweya et al. | |
| 2013/0170507 A1 | 7/2013 | Hsueh | |
| 2013/0301634 A1 | 11/2013 | Ehlers et al. | |
| 2014/0029633 A1 | 1/2014 | Hamamatsu et al. | |
| 2014/0043991 A1 | 2/2014 | Gupta | |
| 2014/0269672 A1 | 9/2014 | Zampetti | |
| 2014/0307746 A1 | 10/2014 | Sasak | |
| 2015/0092796 A1 | 4/2015 | Aweya | |
| 2015/0092797 A1 | 4/2015 | Aweya | |
| 2015/0295669 A1 | 10/2015 | Chapman et al. | |
| 2016/0065358 A1* | 3/2016 | Zhang | H04J 3/0673 375/362 |
| 2016/0170439 A1* | 6/2016 | Aweya | G06F 1/10 713/401 |
| 2016/0170440 A1* | 6/2016 | Aweya | H04L 69/28 713/503 |
| 2016/0241381 A1 | 8/2016 | Mihelic | |
| 2018/0098330 A1 | 4/2018 | Nguyen et al. | |
| 2018/0146443 A1 | 5/2018 | Park et al. | |

OTHER PUBLICATIONS

International Application No. PCT/US2018/043972, International Search Report and Written Opinion dated Oct 15, 2018, 9 pages.

* cited by examiner

DISTRIBUTED RADIO TRANSPARENT CLOCK OVER A WIRELESS NETWORK

CROSS-REFERENCE TO RELATED APPLICATIONS

This application is a continuation of U.S. patent application Ser. No. 16/046,948, filed Jul. 26, 2018, entitled "Distributed Radio Transparent Clock Over A Wireless Network," which claims priority to U.S. Provisional Patent Application Ser. No. 62/537,375 filed Jul. 26, 2017, and entitled "Distributed Radio Transparent Clock (DR-TC)" which are hereby incorporated by reference herein.

BACKGROUND

1. Field of the Invention(s)

The present invention(s) generally relate to transparent clocks across a network. More particularly, the invention(s) relate to systems and methods for transparent clock signals across wireless network.

2. Description of Related Art

A Radio Transparent Clock (R-TC) can be employed to deliver highly accurate time using the IEEE 1588 protocol over microwave links. The Radio Transparent Clock accounts for the packet delay variation and asymmetry of microwave link. Both quantities are crucial for IEEE 1588 timing accuracy but unfortunately also an inherent property of microwave radio interfaces.

Current synchronization techniques are capable of transferring frequency synchronization across the physical layers used to transport the data (electrical, optical or wireless) but to achieve phase synchronization algorithms like IEEE 1588v2 may be utilized. Unfortunately, the phase synchronization process at the packet level, as recommended by IEEE 1588v2, imposes several restrictions and complexities if used across wireless links.

SUMMARY

An example method comprises receiving, by a first PHY of a first transceiver, a timing packet, timestamping, by the first transceiver, the timing packet and providing the timing packet to a first intermediate node, receiving, by the first intermediate node, the timing packet from the first transceiver, determining a first offset between the first intermediate node and the first transceiver, updating a first field within the timing packet with the first offset between the first intermediate node and the first transceiver, the offset being in the direction of the second transceiver, receiving the timing packet by a second transceiver, the timing packet including the first field, information within the first field being at least based on the first offset, determining a second offset between the second transceiver and an intermediate node that provided the timing packet to the second transceiver and correcting a time of the second transceiver based on the information within the first field and the second offset.

Determining the first offset between the first intermediate node and the first transceiver may comprise receiving, at the first intermediate node, a request airframe from the first transceiver, the request airframe including a first timestamp indicating a first time T1 that the request airframe was transmitted from the first transceiver, the first transceiver and the second transceiver including a first and second counters, respectively, timestamping, by the first intermediate node, a second time indication indicating a second time T2 that the request airframe was received, generating a respond airframe and including within the respond airframe a third time indication indicating a third time T3 that the respond airframe is to be transmitted to the first transceiver, transmitting the respond airframe to the first transceiver, providing, by the first intermediate node, a timestamp information request to the first transceiver, receiving a timestamp information response, from the first transceiver, in response to the timestamp information request, the timestamp information response including a fourth time indication indicating a fourth time T4 when the respond packet was received by the first transceiver, calculating, by the first intermediate node, the first offset using the first time second time, third time, and fourth time as follows:

$$\text{counter offset} = \frac{(TS1 + TS4 - TS3 - TS2)}{2}.$$

In various embodiments, the first and second counters are synchronized with each other before the counter offset is calculated. The first transceiver and the second transceiver may have synchronized frequencies. The first counter may be a PTP counter.

In some embodiments, the method may further comprise determining between the first transceiver and the first intermediate node asymmetry (ASY) in the wireless link and calculating the counter offset includes:

$$\frac{(TS1 + TS4 - TS3 - TS2)}{2} \pm \frac{Asy}{2}.$$

In some embodiments, the method may further comprise providing the timing packet by the first intermediate node to a second intermediate node, receiving, at the second intermediate node, a request airframe from the first intermediate node, the request airframe including a first timestamp indicating a first time T1 that the request airframe was transmitted from the first intermediate node, timestamping, by the second intermediate node, a second time indication indicating a second time T2 that the request airframe was received, generating a respond airframe and including within the respond airframe a third time indication indicating a third time T3 that the respond airframe is to be transmitted to the first intermediate node, transmitting the respond airframe to the first intermediate node, providing, by the second intermediate node, a timestamp information request to the first intermediate node, receiving a timestamp information response, from the first intermediate node, in response to the timestamp information request, the timestamp information response including a fourth time indication indicating a fourth time T4 when the respond packet was received by the first intermediate node, calculating, by the second intermediate node, a third offset using the first time, second time, third time, and fourth time as follows:

$$\text{counter offset} = \frac{(TS1 + TS4 - TS3 - TS2)}{2},$$

and updating the first field within the timing packet with the third offset between the second intermediate node and the first intermediate node, the third offset being in the direction of the second transceiver.

The second intermediate node may be the intermediate node that provided the timing packet to the second transceiver. The method may further comprise determining between the second transceiver and the intermediate node that provided the timing packet to the second transceiver, asymmetry (ASY) in the wireless link and calculating the counter offset includes $$\frac{(TS1 + TS4 - TS3 - TS2)}{2} \pm \frac{Asy}{2}.$$

Updating the first field within the timing packet with the first offset between the first intermediate node and the first transceiver may be $TS_{TLV}[i]=TS_{TLV}[i-1]+\text{off}_{TC_{i+1}}$ wherein the first field is a TLV and TS is timestamp and off is a first offset. The method may further comprise the first transceiver updating the first field as follows $TS_{TLV}[1]=TS_{in}+\text{off}_{TC_2}$.

In various embodiments, the second transceiver calculates a residence time based on a time of the timing packet calculated at a PHY of the second transceiver and the information of the first field, as follows $\Delta T_{res}=TS_{out}-TS_{TLV}$. The second transceiver may update a clock based on the residence time as follows $\Delta T_{res}=TS_{out}-TS_{TLV}$.

An example system comprises a first transceiver, a first intermediate node, and a second transceiver. The first transceiver may be configured to receive, by a first PHY, a timing packet over an ethernet connection, a timing packet and timestamp the timing packet. The first intermediate node may be configured to receive the timing packet from the first transceiver, determine a first offset between the first intermediate node and the first transceiver, update a first field within the timing packet with the first offset between the first intermediate node and the first transceiver, the offset being in the direction of the second transceiver. The second transceiver may be configured to receive the timing packet, the timing packet including the first field, information within the first field being at least based on the first offset, determine a second offset between the second transceiver and an intermediate node that provided the timing packet to the second transceiver and correct a time of the second transceiver based on the information within the first field and the second offset.

The first intermediate node configured to determine the first offset between the first intermediate node and the first transceiver may comprise the first intermediate node configured to receive a request airframe from the first transceiver, the request airframe including a first timestamp indicating a first time T1 that the request airframe was transmitted from the first transceiver, timestamp a second time indication indicating a second time T2 that the request airframe was received, generate a respond airframe and including within the respond airframe a third time indication indicating a third time T3 that the respond airframe is to be transmitted to the first transceiver, transmit the respond airframe to the first transceiver, provide a timestamp information request to the first transceiver, receive a timestamp information response, from the first transceiver, in response to the timestamp information request, the timestamp information response including a fourth time indication indicating a fourth time T4 when the respond packet was received by the first transceiver, and calculate, by the first intermediate node, the first offset using the first time, second time, third time, and fourth time as follows:

$$\text{counter offset} = \frac{(TS1 + TS4 - TS3 - TS2)}{2}.$$

The first intermediate node may be further configured to assist to determine between the first transceiver and the first intermediate node asymmetry (ASY) in the wireless link and calculating the counter offset includes $$\frac{(TS1 + TS4 - TS3 - TS2)}{2} \pm \frac{Asy}{2}.$$

In some embodiments, the system may further comprise a second intermediate node, the second intermediate node configured to receive the timing packet from the first intermediate node, receive a request airframe from the first intermediate node, the request airframe including a first timestamp indicating a first time T1 that the request airframe was transmitted from the first intermediate node, timestamp a second time indication indicating a second time T2 that the request airframe was received, generate a respond airframe and including within the respond airframe a third time indication indicating a third time T3 that the respond airframe is to be transmitted to the first intermediate node, transmit the respond airframe to the first intermediate node, provide a timestamp information request to the first intermediate node, receive a timestamp information response, from the first intermediate node, in response to the timestamp information request, the timestamp information response including a fourth time indication indicating a fourth time T4 when the respond packet was received by the first intermediate node, calculate a third offset using the first time, second time, third time, and fourth time as follows:

$$\text{counter offset} = \frac{(TS1 + TS4 - TS3 - TS2)}{2},$$

and update the first field within the timing packet with the third offset between the second intermediate node and the first intermediate node, the third offset being in the direction of the second transceiver.

The second intermediate node may be the intermediate node that provided the timing packet to the second transceiver. The second intermediate node may be further configured to assist to determine between the second transceiver and the intermediate node that provided the timing packet to the second transceiver, asymmetry (ASY) in the wireless link and calculating the counter offset includes $$\frac{(TS1 + TS4 - TS3 - TS2)}{2} \pm \frac{Asy}{2}.$$

The first intermediate node may be configured to update the first field within the timing packet with the first offset between the first intermediate node and the first transceiver as $TS_{TLV}[i]=TS_{TLV}[i-1]+\text{off}_{TC_{i+1}}$ wherein the first field is a TLV and TS is timestamp and off is a first offset. The first transceiver may be further configured to update the first field as follows $TS_{TLV}[1]=TS_{in}+\text{off}_{TC_2}$.

An example method comprises receiving, at a first transceiver, a request airframe from a second transceiver over a wireless link of a network, the request airframe including a first timestamp indicating a first time T1 that the request airframe was transmitted to the first transceiver, the first transceiver and the second transceiver including a first and second counters, respectively, timestamping a second time indication indicating a second time T2 that the request airframe was received, generating a respond airframe and including within the respond airframe a third time indication indicating a third time T3 that the respond airframe is to be transmitted to the second transceiver, transmitting the respond airframe to the second transceiver, providing, by the first transceiver, a timestamp information request to the second transceiver, receiving a timestamp information response, from the second transceiver, in response to the timestamp information request, the timestamp information response including a fourth time indication indicating a fourth time T4, calculating, by the first transceiver, a counter offset using the first time, second time, third time, and fourth time as follows:

$$\text{counter offset} = \frac{(TS1 + TS4 - TS3 - TS2)}{2},$$

calculating, by the first transceiver, a phase offset based on the counter offset, and correcting, by the first transceiver, a phase of the first transceiver.

In various embodiments, the first and second counters are synchronized with each other before the counter offset is calculated. The first transceiver and the second transceiver may have synchronized frequencies. The first counter may be a PTP counter.

In some embodiments, the method further comprises determining asymmetry (ASY) in the wireless link and calculating the counter offset include $$\frac{(TS1 + TS4 - TS3 - TS2)}{2} \pm \frac{Asy}{2}.$$

The first transceiver may generate and transmit the respond airframe immediately after receiving the request airframe. The first transceiver may transmit the timestamp information request to the second transceiver at any time after the respond airframe is received.

The method may further comprise providing, by the second transceiver, a timestamp information request to the first transceiver, receiving a timestamp information response from the first transceiver, in response to the timestamp information request, the timestamp information response including at least the second time indication, calculating, by the second transceiver, a counter offset using the first time, second time, third time, and fourth time as follows:

$$\text{counter offset} = \frac{(TS1 + TS4 - TS3 - TS2)}{2},$$

calculating, by the second transceiver, a phase offset based on the counter offset, and correcting, by the second transceiver, a phase of the second transceiver. Calculating the phase offset by the first transceiver may not be synchronized with calculating the phase offset by the second transceiver. The wireless link may be a microwave link.

Another example method includes generating, by a first transceiver, a request airframe to be sent to a second transceiver over a wireless link of a network, the request airframe including a first timestamp indicating a first time T1 that the request airframe is to be transmitted by the first transceiver, the first transceiver and the second transceiver including a first and second counters, respectively, transmitting the request airframe to the second transceiver, receiving a respond airframe from the second transceiver, the respond airframe including within the respond airframe a third time indication indicating a third time T3 that the respond airframe is to be transmitted to the first transceiver, determining a fourth time indication indicating a fourth time T4 that the respond airframe was received, providing, by the first transceiver, a timestamp information request to the second transceiver, receiving a timestamp information response, from the second transceiver, in response to the timestamp information request, the timestamp information response including a second time indication indicating a second time T2 that the request airframe was received by the second transceiver, calculating, by the first transceiver, a counter offset using the first time, second time, third time, and fourth time as follows:

$$\text{counter offset} = \frac{(TS1 + TS4 - TS3 - TS2)}{2},$$

calculating, by the first transceiver, a phase offset based on the counter offset, and correcting, by the first transceiver, a phase of the first transceiver.

The first and second counters may be synchronized with each other before the counter offset is calculated. The first transceiver and the second transceiver may have synchronized frequencies. The first counter may be a PTP counter. The method may further comprise determining asymmetry (ASY) in the wireless link and calculating the counter offset includes $$\frac{(TS1 + TS4 - TS3 - TS2)}{2} \pm \frac{Asy}{2}.$$

The first transceiver may transmit the timestamp information request to the second transceiver at any time after the respond airframe is received.

In various embodiments, the method may further comprise providing, by the second transceiver, a timestamp information request to the first transceiver, providing a timestamp information response to the second transceiver, in response to the timestamp information request, the timestamp information response including at least the third time indication, calculating, by the second transceiver, a counter offset using the first time, second time, third time, and fourth time as follows:

$$\text{counter offset} = \frac{(TS1 + TS4 - TS3 - TS2)}{2},$$

calculating, by the second transceiver, a phase offset based on the counter offset; and correcting, by the second transceiver, a phase of the second transceiver.

Calculating the phase offset by the first transceiver may not be synchronized with calculating the phase offset by the second transceiver.

An example system may comprise a first transceiver including memory and a processor, the first transceiver configured to: receive a request airframe from a second transceiver over a wireless link of a network, the request airframe including a first timestamp indicating a first time T1 that the request airframe was transmitted to the first transceiver, the first transceiver and the second transceiver including a first and second counters, respectively, timestamp a second time indication indicating a second time T2 that the request airframe was received, generate a respond airframe and including within the respond airframe a third time indication indicating a third time T3 that the respond airframe is to be transmitted to the second transceiver, transmit the respond airframe to the second transceiver, provide a timestamp information request to the second transceiver, receive a timestamp information response, from the second transceiver, in response to the timestamp information request, the timestamp information response including a fourth time indication indicating a fourth time T4, calculate a counter offset using the first time, second time third time, and fourth time as follows:

$$\text{counter offset} = \frac{(TS1 + TS4 - TS3 - TS2)}{2},$$

calculate a phase offset based on the counter offset, and correct a phase of the first transceiver.

Another example system may comprise a first transceiver including memory and a processor, the first transceiver configured to: generate a request airframe to be sent to a second transceiver over a wireless link of a network, the request airframe including a first timestamp indicating a first time T1 that the request airframe is to be transmitted by the first transceiver, the first transceiver and the second transceiver including a first and second counters, respectively, transmit the request airframe to the second transceiver, receive a respond airframe from the second transceiver, the respond airframe including within the respond airframe a third time indication indicating a third time T3 that the respond airframe is to be transmitted to the first transceiver, determine a fourth time indication indicating a fourth time T4 that the respond airframe was received, provide a timestamp information request to the second transceiver, receive a timestamp information response, from the second transceiver, in response to the timestamp information request, the timestamp information response including a second time indication indicating a second time T2 that the request airframe was received by the second transceiver, calculate a counter offset using the first time, second time, third time, and fourth time as follows:

$$\text{counter offset} = \frac{(TS1 + TS4 - TS3 - TS2)}{2},$$

calculate a phase offset based on the counter offset, and correct a phase of the first transceiver.

DETAILED DESCRIPTION

Figure 1:
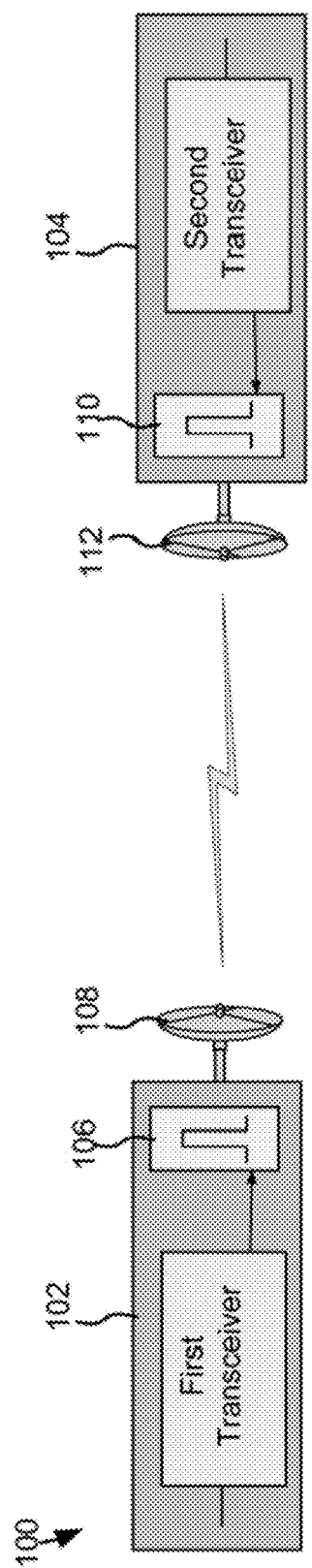
FIG. 1 depicts an example environment including transceiver radio frequency units (RFU) in some embodiments.

Some embodiments described herein provide simple and accurate phase and frequency synchronization across wireless links. Methods and systems are described that detect phase variations across wireless links. The proposed methodology may allow for the creation of a phase and frequency synchronized wireless network.

Some embodiments described herein includes methods and techniques that simplify detection of phase variations over that described regarding IEEE 1588v2 and may, in some embodiments, improve the accuracy of the phase offset calculation. The phase offset calculation may be used for phase synchronization.

In some embodiments, a phase offset is calculated as a relative difference between near-end and far-end units and is calculated on both sides of the wireless link independently. In some embodiments, before the offset calculation is calculated, frequency synchronization is completed, and a time protocol counter may be at the data link layer on each side of the wireless link. This application incorporates by reference US nonprovisional patent application titled "Airframe Timestamping Technique for Point-to-Point Radio Links," filed Jul. 26, 2018.

As discussed herein, the time protocol counter (e.g., precision time protocol (PTP)) on the data link layer on the near-end side of the wireless channel may be referred to as a "local time protocol counter" and the time protocol counter on the far-end side as a "remote time protocol counter."

While embodiments described herein may refer to the IEEE 1588v2 standard, it will be appreciated that embodiments described herein may utilize many different standards and many different protocols. In some embodiments, examples will be described showing an improvement over the IEEE 1588 V2 standard. As discussed herein, various techniques may be utilized in place of or in addition to any number of different protocols and standards (e.g., protocols and standards for frequency synchronization).

Further, as discussed herein, a "unit" may refer to the whole system connecting to other systems either with wired or wireless links.

If there are any additional time protocol counter(s) (e.g., PTP counters) on the unit (e.g., for timestamping Ethernet packets) then most or all of the time protocol counters (e.g., PTP counters) on each unit may be synchronized with each other. In various embodiments, time protocol counter synchronization on the unit is done after frequency synchronization process and before phase offset calculation process. In one example, a local 1PPS signal may be used to synchronize local PTP counters. It may not be relevant for some embodiments described herein which time protocol counter is a source for time protocol counter synchronization. This can be system dependent and/or defined by higher layer(s) of phase synchronization process. Further, initial phase information and master-slave direction may not be relevant for this method/technique.

In some embodiments, higher layer(s) of the phase synchronization process use the phase offset calculation of the particular wireless link to transfer phase synchronization across this wireless link. Higher layer(s) of the phase synchronization process may use the initial phase information to properly perform phase synchronization relative to the initial phase source. The higher layer(s) of the phase synchronization process may be aware of master-slave direction, if needed, by clock type. Direction change may be fast and simple as phase offset calculation may be simultaneously and independently available on each side of the wireless link.

Examples of the method/technique may be capable of phase offset calculation across the data link layer used to handle blocks of data packed into airframes (e.g., OSI layer 2). Airframes are used for transferring blocks of data across wireless links. There is a significant time variation between packets and how they are packed into blocks of data of airframe. This is one of the reasons why phase synchronization at the packet level does not perform as well for phase synchronization across wireless links.

Different embodiments may include any number of the following advantages over the 1588v.2 standard:

(1) Better precision and accuracy—two sides of the point-to-point wireless link (e.g., two microwave routers connected by a microwave radio link) may have better time synchronization precision and accuracy by using methods described herein compared to time-stamping of packets at the packet level (e.g., Ethernet packets). Packet level time synchronization on the prior art introduces additional scattering error (additional latency variation) as well as additional deviation error (additional asymmetrical latency) because there is a significant variable processing delay before packets can be packed into airframes.

(2) Additional statistical precision may be gained through averaging repeated measurements. With averaging measurement, variations may be reduced or minimized due to cross-clock-domain synchronization between asynchronous clock domains.

(3) The method/technique described herein may be independent of the PTP master-slave configuration. In various embodiments, both sides of the wireless point-to-point link calculate their own phase offset (e.g., near-end side calculates phase offset compared to far-end while far-end calculates its own phase offset compared to near-end). The absolute values of both offsets may be the same to the extent of measurement errors while one is a positive value and the other is negative value. This phase offset may be provided to the upper layer on both sides regardless of master-slave configuration. The upper layer may utilize the calculated phase offset in order to provide transport of phase synchronization. The upper layer may be aware of master-slave configuration, if needed, by clock type. Direction change of master-slave configuration may be fast and simple as phase offset calculation may be simultaneously and independently available on each side of the wireless link. However, the method/technique itself (or implementation of the method/technique) may be independent of master-slave configuration, which may make it an easier and more robust solution compared to solutions that depend on master-slave configuration.

(4) Independent of packet fragmentation. Various embodiments described herein may be independent of packet payload data including PTP timing packets (for IEEE 1588v2). When two or more point-to-point radio links are used in parallel from one point to another, then packet fragmentation (e.g., link aggregation like L1LA) may be used over these parallel links to optimize data traffic. This packet fragmentation process does not need to be PTP IEEE 1588v2 aware.

(5) Unaffected user data bandwidth. Some embodiments described herein may utilize transfer of local timestamps and other required synchronization data between both sides of the wireless link to calculate the phase offset. While timestamps required for calculation may be taken close to each other with regards to time, the transfer of this timestamp information between both sides may not be time limited. Simple handshake may be used for this information exchange within the data space for control information, which may be available in every airframe, which may not affect user data bandwidth (user traffic).

FIG. 1 depicts an example environment 100 including transceiver radio frequency units (RFU) 102 and 104 in some embodiments. The transceiver RFUs 102 and 104 depicted in FIG. 1 are in wirelessly communication with each other. In various embodiments, the transceiver RFUs 102 and 104 communicate over microwave radio frequencies although it will be appreciated that transceiver RFUs 102 and 104 may communicate over any portion of the wireless spectrum (e.g., not limited to the microwave spectrum).

Further, although depicted as communicating directly to each other, each of the transceiver RFUs 102 and 104 may communicate via a tower or any other receivers, transmitters, and/or transceivers.

The transceiver RFU 102 includes a first transceiver, a waveguide 106, and an antenna 108. The transceiver RFU 104 includes a first transceiver, a waveguide 110, and an antenna 112.

In various embodiments, the transceivers RFUs 102 and 104 may correct for offset and phase utilizing systems and methods discussed herein.

Figure 2:
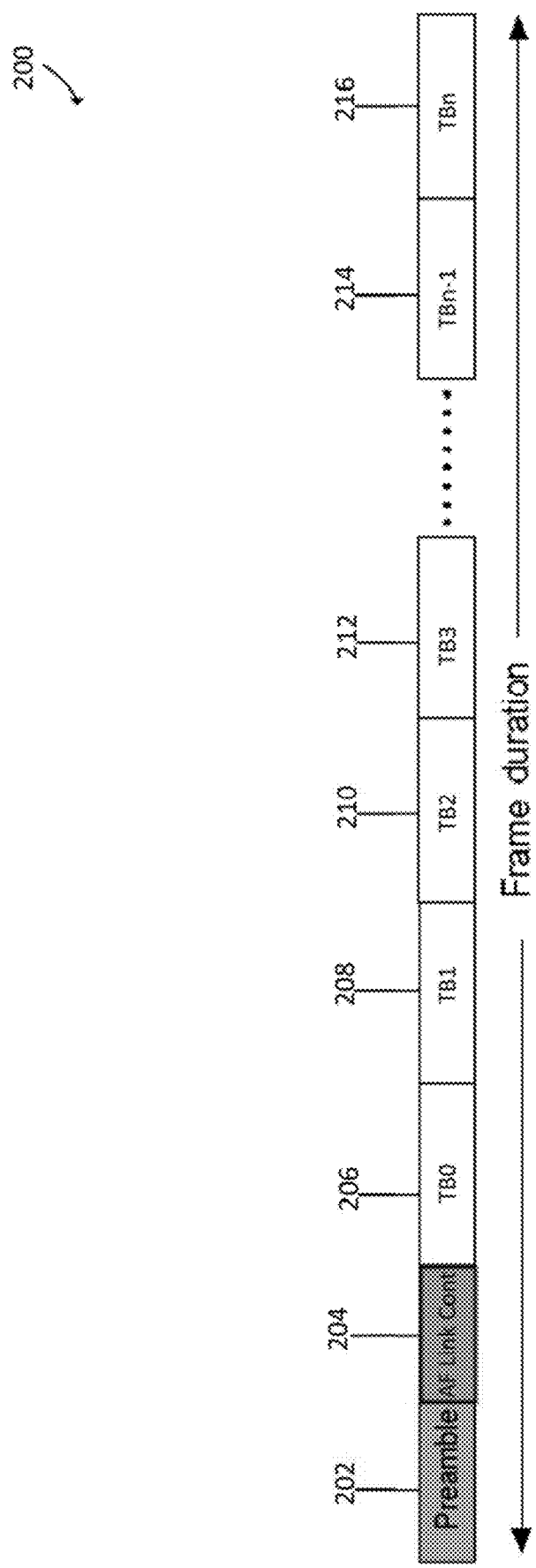
FIG. 2 is an example air frame structure in some embodiments.

The transmission over a microwave path may be based on a continuous synchronous transmission of air frames separated by a preamble. FIG. 2 is an example air frame structure 200 in some embodiments. Such a transmission scheme may be called a Constant Bit Rate (CBR).

In some embodiments, every air frame starts with the preamble 202 which may be a sequence known to the receiver. In this example, the preamble 202 is followed by an Air Frame Link Control field 204, which contains control information defining the air frame 200. In various embodiments, the preamble 202 and the air frame link control field 204 are followed by blocks of QAM (or QPSK) symbols, called transport blocks (TB) 206-216. Transport blocks (e.g., transport blocks 206-216) may be containers for user data (e.g., Ethernet packets, TDM Payload, or the like) and other required control data (e.g., ACM, ATPC, AGC, control loops, or the like) exchanged mutually by microwave modems.

The size of those containers may depend on the current Adaptive Coding Modulation (ACM) state and on the configured framing choice. Adaptive coding modulation allows dynamic change of modulation and FEC level to accommodate for radio path fading which is typically due to weather changes on a transmission path. Benefits of ACM may include improved spectrum efficiency and improved link availability, particularly in wireless (e.g., microwave) links.

One of the disadvantages of changing the modulation level is that this changes the throughput of the wireless (e.g., microwave) link. Such change on the wireless path (or any wireless path segment) causes significant delay variation at the packet level. In one example, high PDV and asymmetry if the changes can occur only in one direction. Transport blocks (e.g., N*QAM Symbols) may also be used as the processing units for FFT operation and for further frequency domain processing. While discussion herein is directed to microwave communication, it will be appreciated that at least some embodiments and discussions herein may be applied to any wireless (e.g., radio frequency (RF)) communication.

The following includes some (not necessarily all) reasons for the complexity of obtaining exact timing of received and transmitted packets at the physical level of a radio interface:

The microwave radio interface operates on a transport block level as a basic data unit.

The transport block(s) require many stages of frequency and time domain processing before the payload can be decoded.

Varying throughput due to ACM activity.

Figure 3:
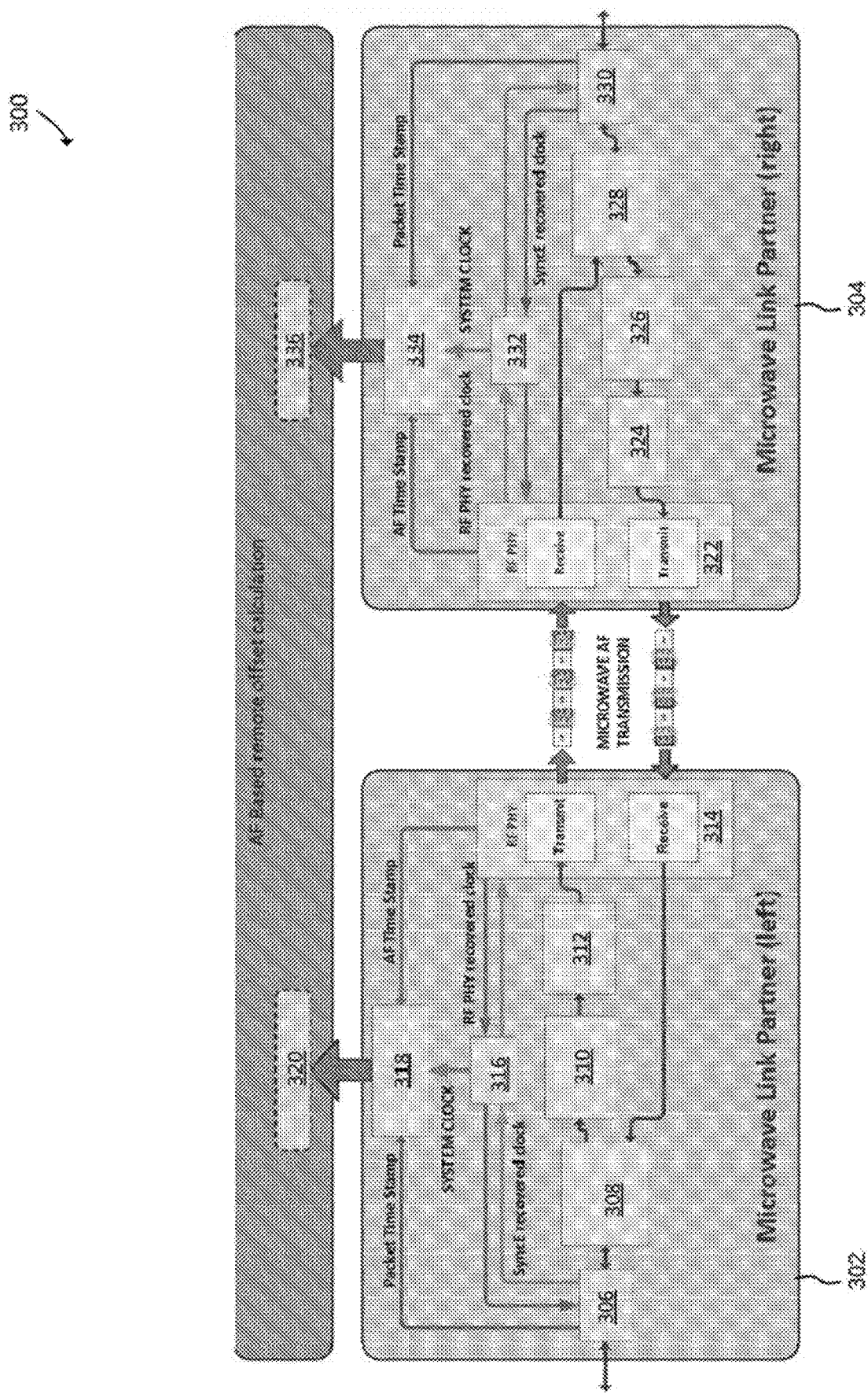
FIG. 3 depicts an environment including microwave link partners in communication over microwave channel in some embodiments.

FIG. 3 depicts an environment 300 including microwave link partners 302 and 304 in communication over microwave channel in some embodiments. The microwave link partners 302 and 304 may be or include transceivers, receivers, or transmitters. In some embodiments, the microwave link partner 302 may receive data to be transmitted over PHY 306.

The PHY 306 may be an Ethernet PHY (e.g., the data to be transmitted may be received over an ethernet cable). The PHY 306 may process and modulate the data into air frames (or any format) and provide the modulated data to the classification and routing module 308.

In various embodiments, systems and methods described herein utilize receiving and providing data over Ethernet cable using an Ethernet Physical Layer device (e.g., PHY 306). Packets and/or PTP packets may be received from a switch or router. In various embodiments, the PHY 306 may perform a timestamp at data ingress of the transceiver and PHY 314 may perform a timestamp at data (e.g., the airframe) egress. Similarly, the PHY 322 of the second microwave link partner 304 may timestamp when data (e.g., the airframe) is received over the microwave channel. In various embodiments, the PHY 330 may perform another timestamp at egress.

The classification and routing module 308 may direct data to be transmitted to the data packet queuing module 310 while directing data received from the radio frequency PHY 314 to the PHY 306. The data packet and queuing module 310 may control data flow (e.g., buffering and/or assist in load balancing) and provide the data to the scheduling module 312 which prepares the modulated data to be transmitted over the radio frequency PHY 314. The radio frequency PHY 314 may transmit the data to another microwave link partner (e.g., microwave link partner 304) and receive data. In various embodiments, the radio frequency PHY 314 communicates over a microwave spectrum.

It will be appreciated that the microwave link partner (e.g., 302) may down convert data (e.g., data received by a gigabit Ethernet PHY) to enable wireless transmission. The transceiver may up or down covert the data to be transmitted (e.g., to an intermediate frequency where further processing may occur and then to an RF frequency for transmission).

Further, there may be elastic buffers to transfer or change the data speed to a lower seed. As a result, phase and offset are increasingly difficult to determine between devices across a wireless channel. Further, the radio may change modulation (e.g., in real-time).

The microwave link partner 304 may receive data from over the microwave channel by the radio frequency PHY 322 which may provide the received data to the classification and routing module 328 for routing and classification of the received data to the PHY 330. The PHY 330 may provide the data to another digital device via Ethernet. Similar to the microwave link partner 304, The PHY 330 of the microwave link partner 304 may be an ethernet PHY (e.g., the data to be transmitted may be received over an ethernet cable). The PHY 330 may process and modulate the data into air frames (or any format) and provide the modulated data to the classification and routing module 328. The classification and routing module 328 may direct data to be transmitted to the data packet queuing module 326. The data packet and queuing module 326 may control data flow (e.g., buffering and/or assist in load balancing) and provide the data to the scheduling module 324 which prepares the modulated data to be transmitted over the radio frequency PHY 322. The radio frequency PHY 322 may transmit the data to another microwave link partner (e.g., microwave link partner 302) and receive data. In various embodiments, the radio frequency PHY 322 communicates over a microwave spectrum.

Both microwave link partners 302 and 304 may include phase lock loops (PLLs) 316 and 322, respectively, to assist in recovery of clock signals using data received from over the wireless channel as described herein. The microwave link partners 302 and 304 may include system clocks 318 and 334, respectively, that may include different time domains.

Offset and phase synchronization module 320 may determine offset and phase synchronization for the microwave link partner 302 based on timestamps of the microwave link partners 302 and 304 as discussed herein. Similarly, offset and phase synchronization module 320 may determine offset and phase synchronization for the microwave link partner 304 based on timestamps of the microwave link partners 302 and 304 as discussed herein.

Figure 4:
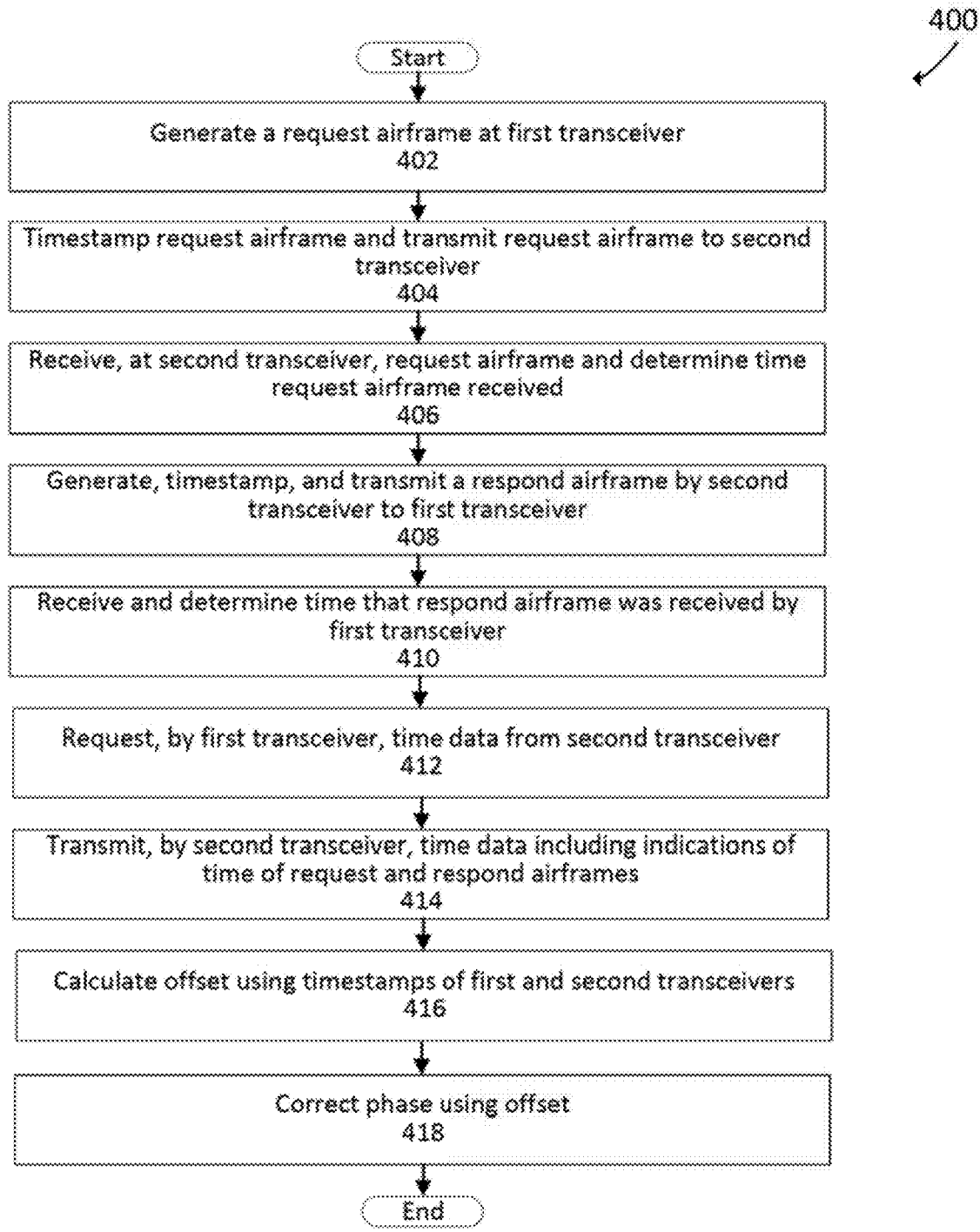
FIG. 4 depicts an example airframe exchange between a first transceiver and a second transceiver in some embodiments.
Figure 5:
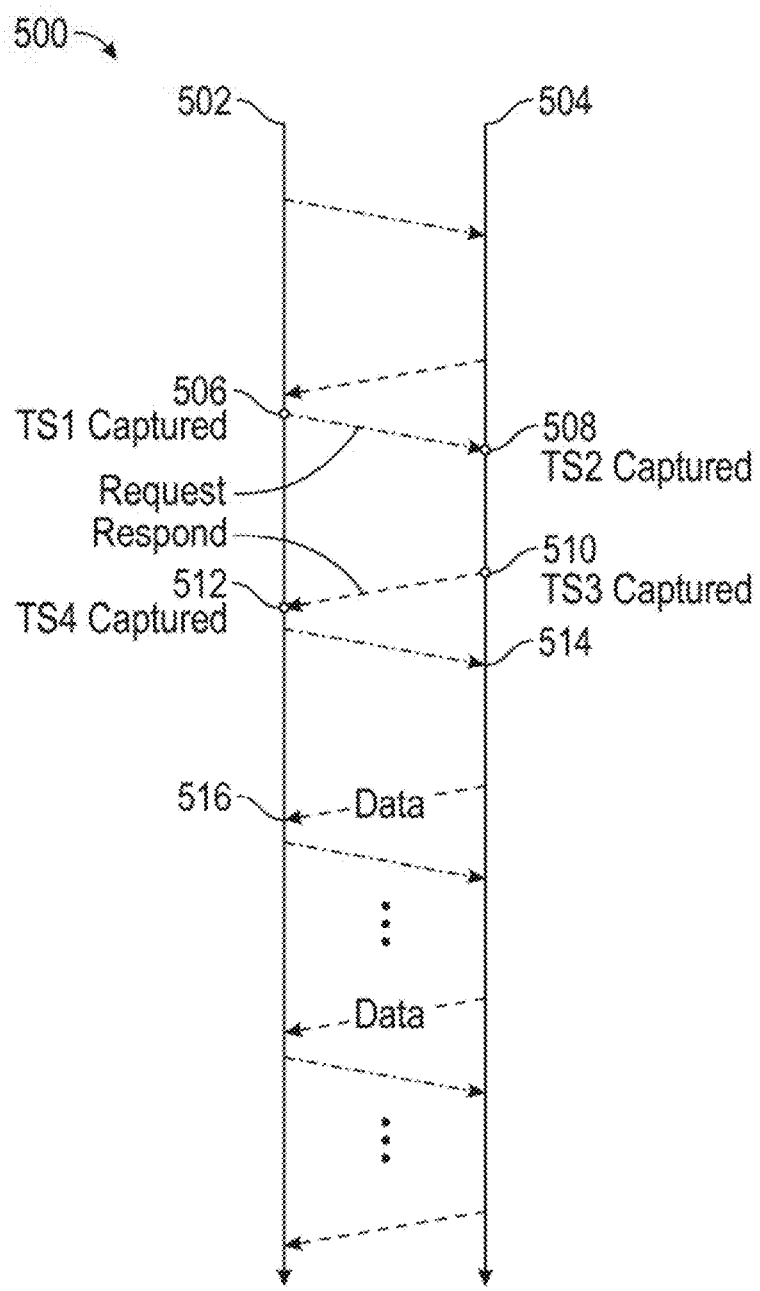
FIG. 5 depicts a data flow between the two transceivers in some embodiments.

FIG. 4 depicts an example airframe exchange between a first transceiver 502 and a second transceiver 504 (e.g., microwave link partners 302 and 304, respectively) in some embodiments. Airframes may be transferred in both directions between local and remote sides with a constant airframe period. In this example, the local side will be referred to as the first transceiver 502 and the remote side will be referred to as the second transceiver 504. Also in this example, the wireless channel is a microwave channel. FIG. 5 depicts a data flow between the two transceivers 502 and 504 in some embodiments.

Timestamping of the airframe may be an independent process for radio egress and ingress directions and the timestamps. In various embodiments, timestamps may be related to airframes rather than to any specific data inside data blocks. This enables the possibility to have fixed latency from the point of timestamp in the near-end modem, over the air, to the point of timestamp in the far-end modem.

Phase offset between local and remote PTP counters on both sides of point-to-point wireless link may be calculated using four timestamps based on two airframes. To collect all four timestamps, the timestamping process of two airframes may be followed by a data exchange process. For the discussion herein, these two airframes may be named "request" and "respond" airframes.

In various embodiments, all airframes, regardless of how we call them, are intact from the traffic data point of view. The additional "channel" inside the airframe for may be utilized this method/technique. It may be desired that this channel takes as little additional bandwidth as possible. In the best case, it can be zero additional bandwidth if an existing channel can be re-used.

In step 402, the first transceiver 502 may mark an airframe as a request airframe 506. It will be appreciated that this airframe may be a PTP airframe, a time protocol airframe, or any other airframe.

In step 404, the first transceiver 502 (e.g., the radio frequency PHY 314) timestamps the request airframe as TS1 and transmits the request airframe 506 from the local side to the second transceiver (e.g., to the remote side (Unit 2) also called transceiver 504) of the point-to-point wireless link. In some embodiments, the first transceiver 502 determines a time TS1 and does not send the timestamp along with the request airframe 506.

In step 406, the second transceiver 504 determines the time and may determine the time that the request airframe was received (TS2) 508.

In step 408, the second transceiver 504 may become the responding side and may respond to this request by creating and transmitting an airframe (e.g., the first possible airframe) in the opposite direction. The responding airframe may be termed a "respond airframe" 510. The second transceiver 504 may determine a third time (TS3) that the respond airframe was sent. The second transceiver 504 may provide an indication of TS2 or TS3 within the respond airframe.

In step 410, the first transceiver 502 may receive the respond air frame and determine a time that the respond airframe was received as TS4 512.

In some embodiments, the respond airframe follows the request airframe as soon as possible in order to minimize or reduce errors introduced by wander frequency of the whole system. Wander frequency has a typical clock period of 100 ms while worst case delay between the request and respond airframes is only a few milliseconds but could be less.

The data exchange process may follow the timestamping process. In some embodiments, this may be the required process to calculate the phase offset, however, it is not time critical. This means that timestamps and other required synchronization data from the responding side may be transferred to the requesting side through several airframes. This may be done within an existing channel built inside the airframe for timestamping purposes. Using the same channel may not be a requirement but it may be desired so that no additional bandwidth is used.

In step 412, one side (e.g., the first transceiver or the second transceiver) may request time or counter data 514 from the other side (e.g., the first transceiver 502 may request synchronization data 514 from the second transceiver 504 or the second transceiver 504 may request synchronization data from the first transceiver 502) in step 414. The responding side may mark the airframes (e.g., as "data" airframes). The receiving side may provide time indications that indicate times that the requesting side does not have. For example, the second transceiver may provide, within a response to the request, time indication indicating when the request airframe was received (TS2) and/or a time that the respond airframe was sent (TS3). Similarly, the first transceiver may provide time indication indicating when the request airframe was sent (TS1) and/or a time that the respond airframe was received (TS4).

In step 416, the requesting side may calculate the offset (e.g., using the offset and phase synchronization module 320 or 336). In various embodiments, offset is calculated on the requesting side after collecting the timestamps and other required synchronization data:

$$\text{Offset} = \frac{(TS1 + TS4 - TS3 - TS2)}{2} \pm \frac{Asy}{2}$$

Any asymmetry on the round trip radio link path (marked as "Asy") influences the calculation as seen from the formula. Asymmetry may be reduced, minimized, or eliminated with the possibility of characterizing and/or measuring each part in the radio link between both sides. If this data can be provided by hardware (HW), then no additional measurements regarding asymmetry may be required.

Value(s) representing asymmetry may be introduced at the time of establishing the wireless link (e.g., preamble locking) while other value(s) (e.g., another part) may be introduced by having different modulations for radio egress and ingress directions of the selected bandwidth.

Asymmetry may be calculated based on information from the modem about transmit and receive FIFOs. An FPGA may calculate the asymmetry.

In step 418, the requesting transceiver may correct phase based on the offset (e.g., the Offset and phase synchronization module 320 or 336 may correct phase using the offset). In various embodiments, the calculated phase offset information is a result at the physical layer and is further available to the higher layer. The higher layer may use this phase offset information to transport the phase synchronization on the packet level. The higher layer may also initiate the phase offset calculation process. There may be also the possibility that the higher layer repeats this process in order to track any changes, especially when modulations are changed.

Figure 6:
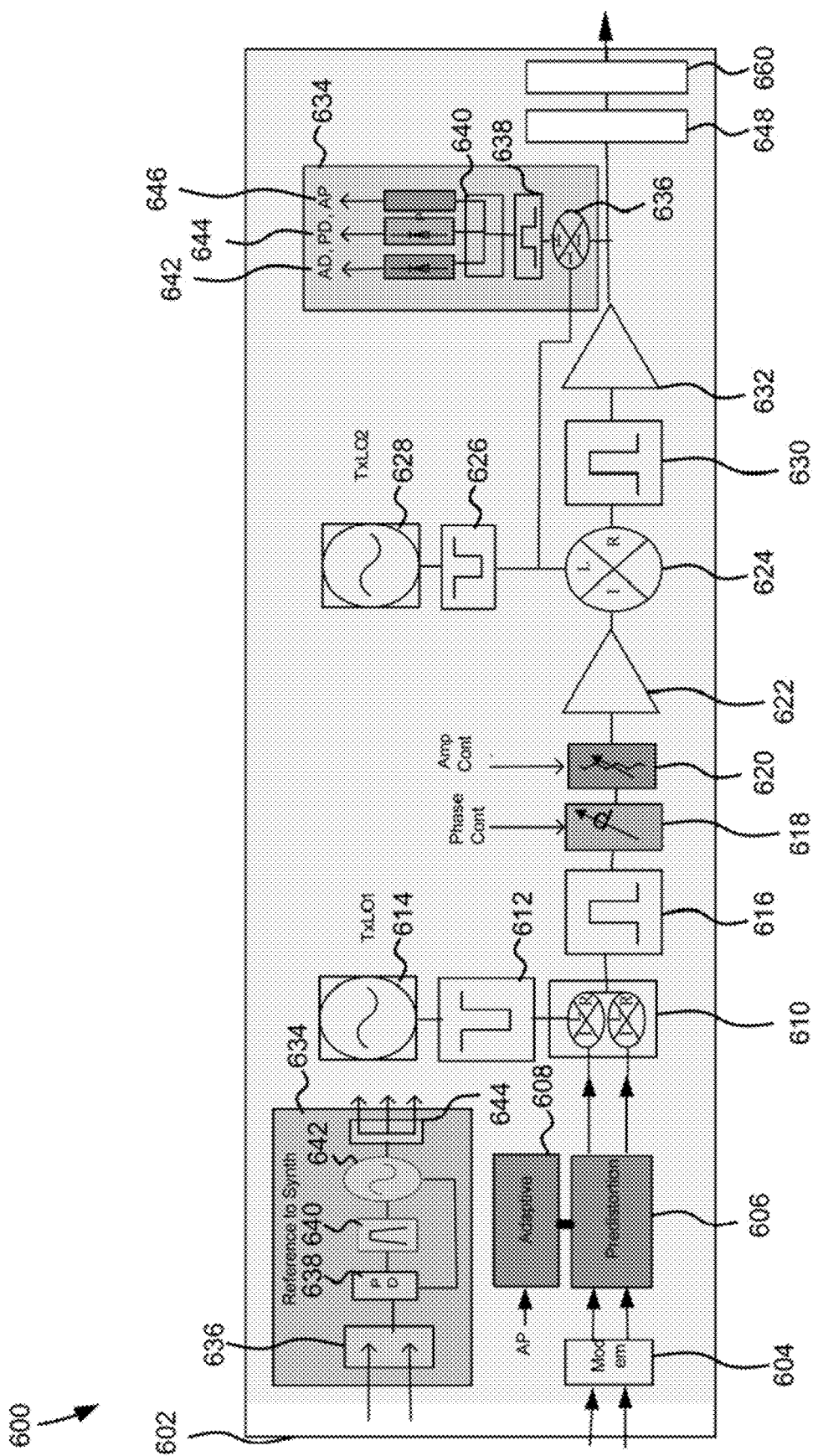
FIG. 6 depicts an example transmitting radio frequency unit in some embodiments.

FIG. 6 depicts an example transmitting radio frequency unit 602 in some embodiments. Although a transmitter is described in FIG. 6, it will be appreciated that all or parts of the transmitter of FIG. 6 may be a part of the first transceiver 602 as discussed herein. In some embodiments, the transmitting radio frequency unit expresses components and a logical flow of transmitting information over a wireless channel. Any transceiver including any functionality may be utilized in performing all or part of the systems and/or methods described herein.

The transmitting radio frequency unit 602 (e.g., radio link partner 302 or radio link partner 304) may comprise a modem module 604, a predistortion module 606, an adaptive module 608, mixer modules 610 and 624, filter modules 612, 616, 626, and 630, oscillator modules 614 and 628, a phase adjuster 618, an automatic gain control (AGC) module 620, amplification/attenuation module 622, a power amplifier 632, a signal quality module 634, waveguide filter 648, and waveguide 660.

In some embodiments, the transceiver 602 includes a digital signal processor (e.g., DSP). The DSP is any processor configured to provide one or more signals to the modem module 604. The digital signal processor (DSP) may comprise a digital signal processor, or another digital device, configured to receiving a source signal intended for transmission and converting the source signal to corresponding in-phase (I) and quadrature (Q) signals. For instance, the DSP may be implemented using a digital device (e.g., a device with a processor and memory). Instructions stored on the storage system may instruct the DSP to receive an input signal from a communications network interface, convert the input signal to corresponding the in-phase (I) and quadrature (Q) signals, and provide the corresponding in-phase (I) and quadrature (Q) signals.

The modem module 604 may be any modem configured to receive one or more signals to be transmitted. The modem module 604, in one example, may receive an in-phase (I) and quadrature (Q) signals and provide the signals to the predistortion module 606. The modem module 604 may comprise a modem device, or another digital device. The modem module 604 may be configured to receive in-phase (I) and quadrature (Q) signals and modulate the in-phase (I) and quadrature (Q) signals to encode the information.

The predistortion module 606 may receive the signal from the modem module 604 and improve the linearity of the signal. In various embodiments, the predistortion module 606 inversely models gain and phase characteristics and produces a signal that is more linear and reduces distortion. In one example, "inverse distortion" is introduced to cancel non-linearity. The predistortion module 606 may receive a predistortion control signal based on a comparison of a signal from the power amplifier 632. In one example, the predistortion module 606 may receive a signal based on the power amplifier 632 in order to add distortion to an input signal to the power amplifier 632 to cancel (e.g., non-linear) noise generated by the power amplifier 632.

The adaptive module 608 may provide the predistortion control signal based on the sample from the signal quality module 634 described herein. The predistortion module 606 may provide the I and Q signals to the mixer module 610.

The mixer module 610, filter module 612, and the oscillator module 614 may represent an upconverter configured to upconvert the signals to an intermediate frequency signal. Similarly, the mixer module 624, filter module 626, and oscillator module 628 also may represent an upconverter configured to further upconvert the signal to an RF signal. Those skilled in the art will appreciate that there may be any number of upconverters configured to upconvert the signals within the transceiver radio frequency unit 602.

The mixer modules 610 and 624 may comprise mixers configured to mix the signal(s) provided by the modem with one or more other signals. The mixer modules 610 and 624 may comprise many different types of mixers with many different electrical properties. In one example, the mixer 610 mixes I and Q signals received from the predistortion module 606 with the filtered oscillating signal from the filter module 612 and the oscillator module 614. In another example, the mixer module 624 mixes a signal received from the amplifier/attenuator module 622 with the filtered oscillating signal from the filter module 626 and the oscillator module 628.

The filter modules 612, 616, 626, and 630 may comprise filters configured to filter the signal. The filter modules 612, 616, 626, and 630 may comprise many different types of filters (e.g., bandpass filter, low pass filter, high pass filter, or the like) with many different electrical properties. In one example, the filter module 612 may be a band pass filter configured to filter the oscillation signal (or components of the signal) provided from the oscillator module 614. Similarly, filter modules 612, 616, 626, and 630 may filter signals (or components of the signals) from the oscillator module 614, the oscillator module 628, the mixer module 610, or the mixer module 624, respectively.

The oscillator modules 614 and 628 may comprise oscillators configured to provide an oscillating signal that may be used to upconvert the signal. The oscillator modules 614 and 628 may comprise any kind of oscillator with any different electrical properties. In one example, the oscillator module 614 provides an oscillating signal to the filter module 612. The oscillator module 628 may provide an oscillating signal to the filter module 626.

The oscillator modules 614 and 628, either individually or together, may be local or remote. In one example, the oscillating module 614 and/or the oscillating module 628 may be remotely located and configured to provide an oscillating signal to one or more transmitting radio frequency units. In some embodiments, a single oscillating module may provide an oscillating signal to both the mixer module 610 and 624, respectively (e.g., optionally via a filter). In one example, the oscillator signal from the oscillator module may be altered (e.g., oscillation increased or decreased) and provided to a different part of the circuit.

The signal quality module 634 may be configured to generate a phase control signal to control the phase of a processed signal. In one example, the signal quality module 634 receives the upconverted RF signal from the power amplifier 632 and mixes the signal with the filtered oscillator signal or the upconverted signal from the second upconverter (e.g., mixer module 624, filter module 626, and oscillator module 628). The signal quality module 634 may filter the signal and compare the filtered, mixed signal with a predetermined phase value to generate a phase control signal based on the comparison.

The phase adjuster 618 may comprise a variable phase control circuit configured to increase or decrease the phase of the signal to be transmitted. The phase adjuster 618 may comprise any different type of phase adjuster or phase shifter with different electrical properties. In one example, the phase adjuster 618 increases or decreases the phase of the signal received from the filter module 616. The phase adjuster 618 may adjust the phase of the signal based on the phase control signal from the signal quality module 634.

The phase adjuster 618 may include one or more components. For example, the phase adjuster 618 may comprise one or more phase control elements.

The AGC module 620 may comprise an automatic gain control (AGC) circuit configured to increase or decrease the gain of the signal received from the phase adjuster 618. The AGC module 620 may comprise many different types of AGCs with many different electrical properties. In one example, the AGC module 620 increases or decreases the gain of the signal received from the phase adjuster 618. The AGC module 620 may adjust the gain of the signal based on the gain control signal.

In various embodiments, in order to adjust the phase of the signal or the amplitude of the signal, the signal quality module 634 may provide control signals to adjust the in-phase (I) and quadrature (Q) signals to achieve a desired adjustment. For example, in order to adjust the phase or amplitude of the signal, the signal quality module 634 may utilize the digital signal DSP to adjust the in-phase (I) and quadrature (Q) signals provided to the modem module 604 to achieve the desired adjustment based on the predetermined phase value and/or the predetermined amplitude value. In another example, in some embodiments, the signal quality module 634 may utilize the modem module 604 to adjust the in-phase (I) and quadrature (Q) signals provided to the predistortion module 606.

The amplification/attenuation module 622 may comprise an amplifier and/or an attenuator configured to amplify and/or attenuate a signal. The amplification/attenuation module 622 may be any kind of amplifier(s) and/or attenuator(s). Further, the amplification/attenuation module 622 may comprise amplifiers and/or attenuators with any kind of electrical properties. The power amplifier 632 may amplify the signal to be transmitted. It will be appreciated that the power amplifier 632 may add noise to the signal to be transmitted (e.g., nonlinear noise) which may be dynamically canceled through the addition of distortion in the signal to be transmitted by the predistortion module 606.

In some embodiments, the amplifier/attenuator module 622 receives a signal from the AGC module 620. The amplifier/attenuator module 622 may amplify or attenuate the signal. Further, the power amplifier 632 may amplify power of the signal (or components of the signal) after the signal has been upconverted by the mixer module 624, the filter module 626, and the oscillator module 628. The power amplifier 632 may then provide the signal to the signal quality module 634 and/or the waveguide filter 648.

The transceiver radio frequency unit 602 may comprise the waveguide filter 648, the waveguide 650, and/or a diplexer. The waveguide filter 648 may be any filter coupled to the waveguide 650 and configured to filter the electromagnetic waves (e.g., remove noise). The waveguide 650 may provide the signal to the antenna via a diplexer. The diplexer may provide the signal to the antenna. Similar to the waveguide 646, the waveguide 650 may be any waveguide kind or type of waveguide.

In various embodiments, by utilizing open loop calibration, the total phase and amplitude for the whole transmitter path may be calibrated from I and Q input to the output of the power amplifier 632. In some embodiments, by calibration and look-up tables, the phase and amplitude may be accurately detected, controlled, and set at the Tx output directly or through adjusting I and Q signals at the input. The phase offset calculation, as discussed herein, may be processed at the PHY level (as opposed to the packet level). With PHY level processing, at least some systems and methods described utilize the block data level (block level) of the airframe, the symbol level of the airframe, or any combination of both.

Blocks of data may be mapped by the modem into symbols to be transmitted by the radio and are de-mapped by the modem using symbols received from the radio. The start of the airframe may be timestamped locally either at the block level or at the symbol level. In various embodiments, both sides of a wireless link timestamp the airframe in the same manner to provide a symmetrical environment from the time point of view.

Figure 7:
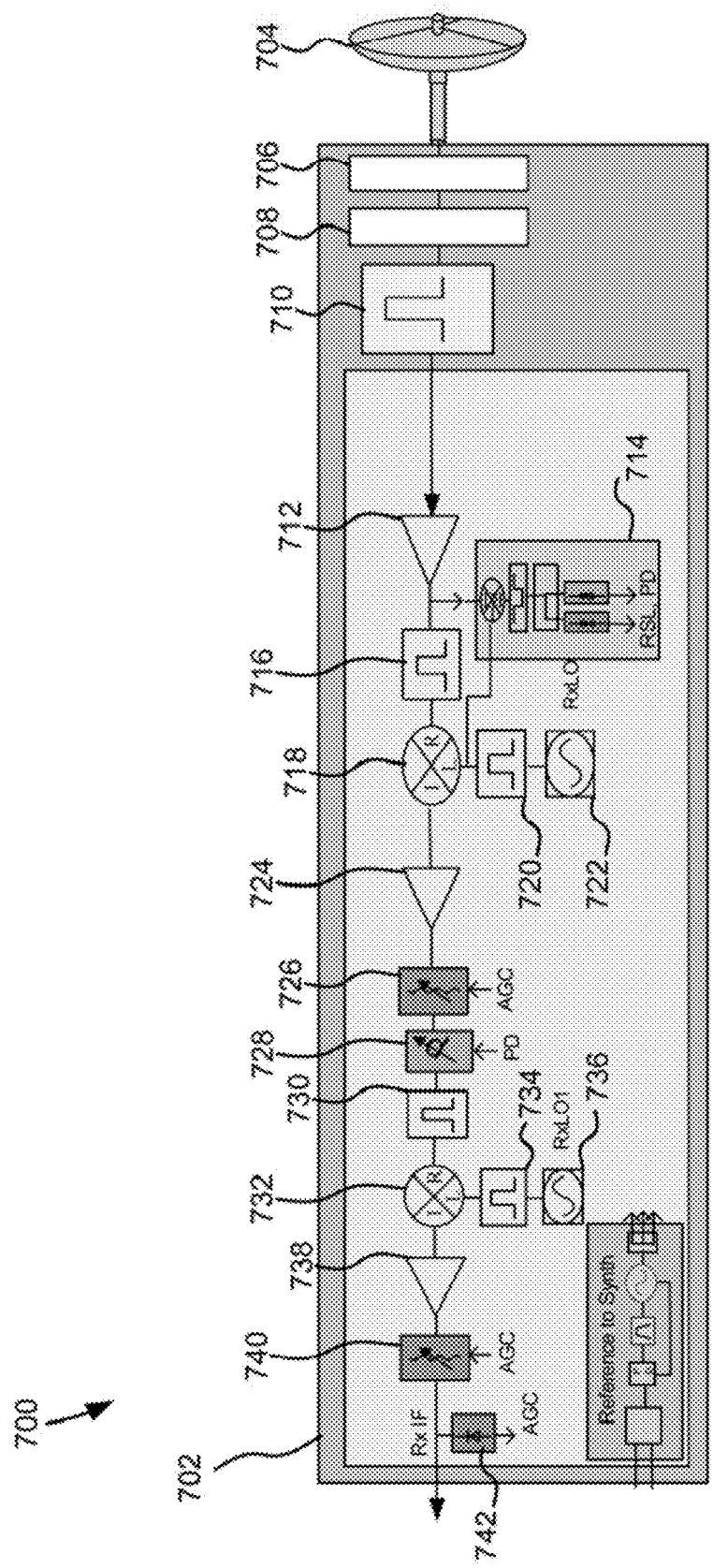
FIG. 7 is a block diagram of an example transceiver RFU in some embodiments.

FIG. 7 is a block diagram 700 of an example transceiver RFU 702 in some embodiments. Although a receiver is described in FIG. 7, it will be appreciated that all or parts of the transmitter of FIG. 7 may be a part of the second transceiver 504 as discussed herein. In some embodiments, the receiving radio frequency unit 702 expresses components and a logical flow of transmitting information over a wireless channel. Any transceiver including any functionality may be utilized in performing all or part of the systems and/or methods described herein.

Block diagram 700 comprises an antenna 704 and a diplexer 710 coupled to the waveguide 706. The waveguide 706 may provide the signal from the antenna 704 to the diplexer 710 via a waveguide filter 708. The diplexer 710 may provide the signal to the receiving radio frequency unit 702. In some embodiments, the receiving radio frequency unit 702 may comprise the waveguide 706, the waveguide filter 708, and/or the diplexer 710.

The waveguide 706 may be any waveguide kind or type of waveguide. For example, the waveguide 706 may be hollow or dielectric. In some embodiments, the waveguide 706 comprises a rectangular to circular waveguide. The waveguide filter 708 may be any filter coupled to the waveguide 706 and configured to filter the electromagnetic waves from the waveguide 706 (e.g., remove noise).

In various embodiments, the receiving radio frequency unit 702 is configured to receive a signal from the antenna 704 via the diplexer 710 and adjust the phase of the received signal. The phase of the received signal may be adjusted based on a comparison of the phase of the signal and a predetermined phase value. In some embodiments, the receiving radio frequency unit 702 may also be configured to adjust the gain of the received signal. In one example, the receiving radio frequency unit 702 may adjust the gain of the received signal based on a comparison of a gain of the received signal with a predetermined gain value.

The receiving radio frequency unit 702 may be any receiver including, but not limited to, a traditional heterodyne receiver with RX intermediate frequency (IF) output. Those skilled in the art will appreciate that multiple receiving radio frequency units may be used to receive the same signal (e.g., signals containing the same information provided by a wireless communication source). Each receiving radio frequency unit may adjust the phase of the received signal, respectively, based on the same predetermined phase value. Similarly, each receiving radio frequency unit may adjust the gain of the received signal, respectively, based on the same gain value. As a result, the phase and gain of the signal from each receiving radio frequency unit may be the same or substantially similar (e.g., the phase and gain of the signals may be identical). The signals may be subsequently combined to strengthen the signal, increase dynamic range, and/or more accurately reproduce the information that was wirelessly transmitted.

The receiving radio frequency unit 702 may comprise amplification/attenuation modules and/or power amplifiers 712, 724, and 738, filter modules 716, 720, 730, and 734 mixer modules 718 and 732, oscillator modules 722 and 736, phase control module 714, automatic gain control modules 726, 740, and 742, and variable phase module 728.

The amplification/attenuation modules 712, 724, and 738 may comprise an amplifier and/or an attenuator configured to amplify and/or attenuate a signal. The amplification/attenuator modules 712, 724, and 738 may be any kind of amplifiers and/or attenuators. Further, the amplification/attenuator modules 712, 724, and 738 may each comprise amplifiers and/or attenuators with any kind of electrical properties.

In some embodiments, the amplifier/attenuator module 712 receives a signal via the antenna 704 and the diplexer 710. The amplifier/attenuator module 712 may be a low noise amplifier configured to amplify the signal (or components of the signal) before providing the signal to the filter module 716 and the phase control module 714. Further, the amplifier/attenuator module 724 may attenuate the signal (or components of the signal) after the signal has been downconverted by the mixer module 718, the filter module 720, and the oscillator module 722. The amplifier/attenuator module 724 may then provide the signal to the automatic gain control 726. The amplification/attenuator module 738 may attenuate the signal (or components of the signal) after the signal has been downconverted by the mixer 732, the filter module 734, and the oscillator module 736. The amplifier/attenuator module 738 may then provide the signal to the automatic gain control 740.

Those skilled in the art will appreciate that each of the amplifier/attenuator modules 712, 724, and 738 may be the same as one or more other amplifier/attenuator modules. For example, amplifier/attenuator modules 712 and 724 may both be amplifiers sharing the same electrical properties while amplifier/attenuator module 738 may be an attenuator. In another example, amplifier/attenuator modules 712 and 724 may both be amplifiers but have different electrical properties.

Each amplifier/attenuator module 712, 724, and 738 may include one or more components. For example, the amplifier/attenuator module 712 may comprise one or more amplifiers and/or attenuators.

The filter modules 716, 720, 730, and 734 may comprise filters configured to filter the signal. The filter modules 716, 720, 730, and 734 may comprise many different types of filters (e.g., bandpass filter, low pass filter, high pass filter, or the like) with many different electrical properties. In one example, the filter module 716 may be a band pass filter configured to filter the signal (or components of the signal) received from the amplification/attenuation module 712 before providing the signal to the mixer module 718. Similarly, filter modules 720, 730, and 734 may filter signals (or components of the signals) from the oscillator module 722, the phase adjuster 728, and the oscillator module 736, respectively.

Those skilled in the art will appreciate that each of the filter modules 716, 720, 730, and 734 may be the same as one or more other filter modules. For example, filters module 716 and 720 may both be filters sharing the same electrical properties while filter module 730 may be another kind of filter. In another example, filters module 716 and 720 may both be filters of a similar type but have different electrical properties.

Each filter modules 716, 720, 730, and 734 may include one or more components. For example, the filter modules 716 may comprise one or more filters.

The mixer modules 718 and 732 may comprise mixers configured to mix the signal received from the antenna with one or more other signals. The mixer modules 718 and 732 may comprise many different types of mixers with many different electrical properties. In one example, the mixer 718 mixes a signal received from the filter module 716 with the filtered oscillating signal from the filter module 720 and the oscillator module 722. In another example, the mixer module 732 mixes a signal received from the filter module 730 with the filtered oscillating signal from the filter module 734 and the oscillator module 736.

Those skilled in the art will appreciate that each of the mixer modules 718 and 732 may be the same as one or more other mixer modules. For example, mixer modules 718 and 732 may both be mixers sharing the same electrical properties or, alternately, the mixer modules 718 and 732 may be another kind of mixer and/or with different electrical properties.

Each mixer modules 718 and 732 may include one or more components. For example, the mixer module 718 may comprise one or more mixers.

Figure 8:
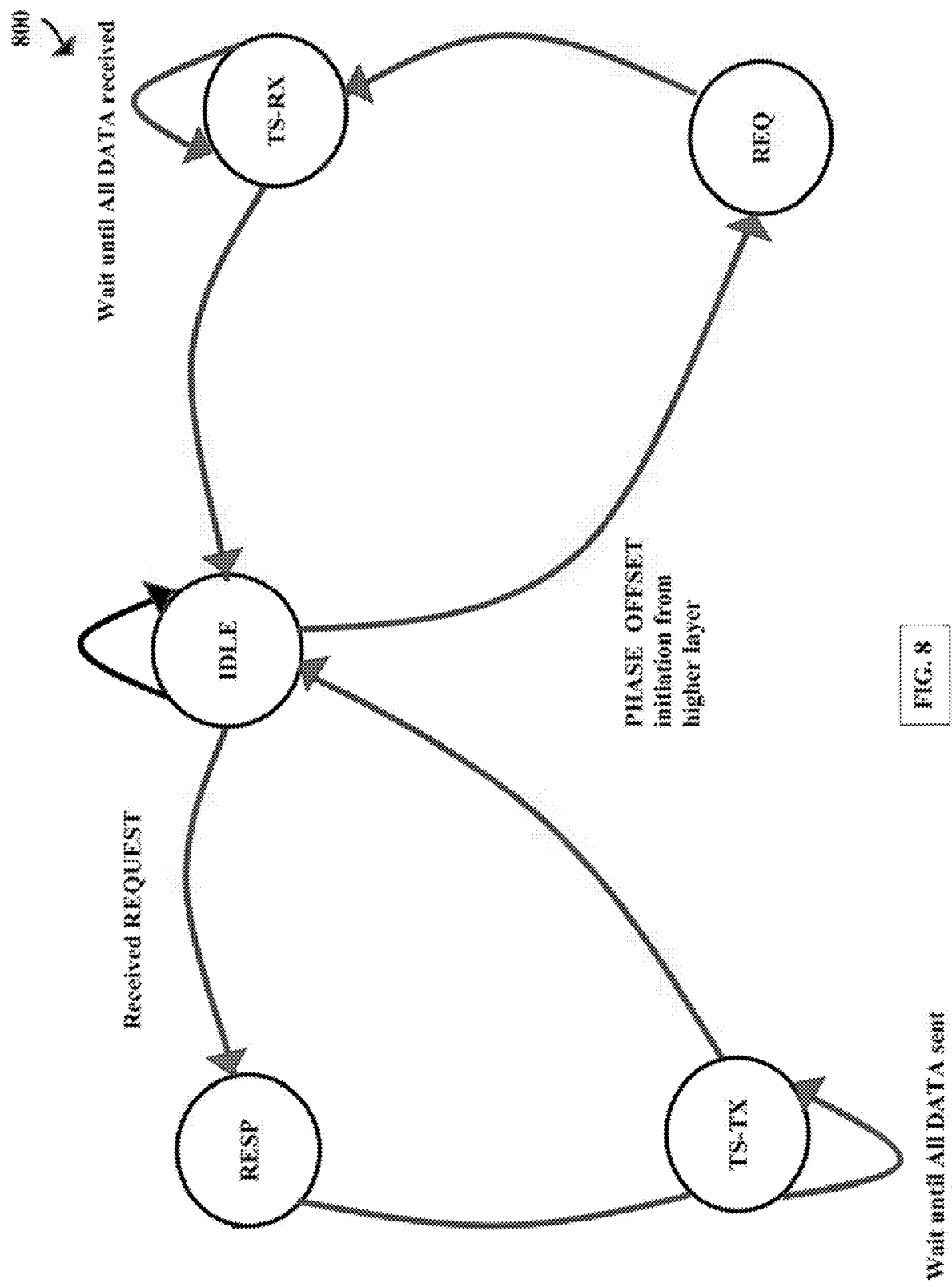
FIG. 8 is an example diagram depicting a simplified Finite State Machine (FSM) as one of the possible implementations of the data exchange process.

FIG. 8 is an example diagram depicting a simplified Finite State Machine (FSM) as one of the possible implementations of the data exchange process. Note that timestamping of airframes is done in this example with regards to the state of the FSM and with regard to the received airframes.

Each side of wireless link may start its own process of phase offset calculation and that they may be independent between each other. From the time point of view, they can start simultaneously or not. From the data point of view, each side may collect its own timestamps for calculating phase offset. It may not be relevant for this method/technique which side starts first.

Unlike optical or copper media, the physical layer of a radio interface is not aware of individual Ethernet packets, where an Ethernet packet is the basic transmission unit transmitted on the physical layer. Both Ethernet packets and airframes are basic transmission units in their own medium. From synchronization perspective, the airframe can be treated as a substitute for the Ethernet packet (e.g., PTP Sync message carrying timing information). Joining microwave PHY specifics with existing a PTP timestamping mechanism enables timestamping the airframe instead of the Ethernet packet.

The transmission over a microwave path is typically based on a continuous synchronous transmission of air frames separated by a preamble. As described herein, FIG. 2 is an example air frame structure 200 in some embodiments. Such transmission scheme is also called Constant Bit Rate (CBR). In some embodiments, every air frame starts with the preamble 202 which may be a sequence known to the receiver. The preamble 202 is followed by an Air Frame Link Control field 204, which contains control information defining the air frame 200. In various embodiments, the preamble 202 and the air frame link control field 204 are followed by blocks of QAM (or QPSK) symbols, called transport blocks (TB) 206-216. Transport blocks (e.g., transport blocks 206-216) may be containers for user data (e.g., Ethernet packets, TDM Payload, or the like) and other required control data (e.g., ACM, ATPC, AGC, control loops, or the like) exchanged mutually by microwave modems.

The size of those containers may depend on the current Adaptive Coding Modulation (ACM) state and on the configured framing choice. Adaptive coding modulation allows dynamic change of modulation and FEC level to accommodate for radio path fading which is typically due to weather changes on a transmission path. Benefits of ACM may include improved spectrum efficiency and improved link availability, particularly in wireless (e.g., microwave) links.

One of the disadvantages of changing the modulation level is changing the throughput of the microwave link. Such change on the microwave path (or any microwave path segment) causes significant delay variation at the packet level. In one example, high PDV and asymmetry if the changes can occur only in one direction.

Additional factors contributing PDV and asymmetry, related to ACM, is the use of frequency division duplex (FDD) scheme, which is common practice of any modern microwave modem. Because of the FDD scheme, it is likely that one direction is more impacted by the radio path fading than the other. Hence the ACM shift can occur only in one direction. If the ACM shift occurs only in one direction the magnitudes of PDV and asymmetry are even higher and more disruptive for the synchronization. Yet a further contributing factor related to ACM is in its dynamics. As discussed above, the dynamics of ACM activity are a consequence of environmental change in order to accommodate for radio path fading. As such the ACM activity is hard or even impossible to predict and that affects also the effectiveness of algorithms that strive to eliminate (to compensate and/or to filter out) the impact of ACM on synchronization performance.

Between the microwave PHY and MAC layers there may also be packet buffers (FIFOs) to allow data rate adjustments between these two planes. Packet buffering additionally distorts packet timing information, thus causes additional PDV. Ethernet packets are processed at the MAC layer where they were already exposed to all of the above mentioned disturbances. Thus, the timing information in the PTP synchronization packet obtained at the MAC layer of the radio interface is consequently already distorted as well. This means that the precise and accurate timestamping of the PTP packet, which is the main advantage of PTP in achieving high synchronization accuracy, has no benefit if the timestamping is performed at the MAC level of a radio interface.

Phase/time accuracy measurements performed with various PTP slaves from different vendors show that even advanced state of the art packet filtering algorithms employed on a PTP slave without explicit in-depth knowledge about the given radio PHY and its current state, show little improvement on synchronization accuracy. Without adequate full on-path support from the microwave system packet filtering algorithms, implemented on a PTP Slave, cannot guarantee that the net error, introduced by single MW link, will be below 1.1 µs. The 1.1 µs is the highest targeted budget for network equipment (excluding budgets for PRTC/GM, end Slave device and holdover) specified by ITU-T [2] in order to support mobile communication technologies like LTE-TDD. The technology like LTE-A, 5G and beyond requires an even more stringent phase/time accuracy which goes down to 500 ns and even below 100 ns for special applications (MIMO, Location Services, CA and CoMP between any two stations in the network).

Based on the foregoing, it is clear that the MAC layer of a radio interface and layers above it cannot provide adequate timing information required for precise synchronization.

In reviewing signals related to the PHY level of the radio interface on various radio modems from different vendors, the most relevant timing signals that can be used appear to be those indicating individual symbol and/or group of symbols like start of AF or preamble signal.

Unfortunately, the accessibility of such signals and the level at which they are accessible in practice varies with different PHY implementations and with different PHY vendors. For that reason, it is impossible to generalize the approach of exploiting native timing signals present in the microwave radio PHY. Exploiting those signals requires an in-depth explicit knowledge of the given PHY implementation and the way such timing signals are accessed. Especially it is important to know all the elements contributing to the transmit and receive PHY latency at the level of the accessed timing signal. Such elements are FIFOs (and its depth variation) in transmit and receive path, modulator/demodulator latency, digital filters, equalizers and other DSP blocks. The accurate transmit and receive PHY latencies are essential parameters needed for the estimation of the PHY asymmetry. Without explicit knowledge about the PHY latencies (i.e. being able to measure it or estimate it), even the timing signals, accessed on a PHY level, per se cannot satisfy requirements for precise synchronization.

The following includes some (not necessarily all) reasons for the complexity of obtaining exact timing of received and transmitted packets at the physical level of a radio interface:
The microwave radio interface operates on a transport block level as a basic data unit.
The transport block(s) require many stages of frequency and time domain processing before the payload can be decoded.
Varying throughput due to ACM activity.

In various embodiments, to overcome one or more of the above-mentioned MAC level disadvantages, a Distributed Radio Transparent Clock (DR-TC) may enable accurate time transport over wireless (e.g., microwave) links leveraging the widely adopted IEEE1588 protocol.

In some embodiments, one aspect of the developed DR-TC may be the use of accurate timing information obtained at the PHY layer of a microwave radio interface for the calculation of the required correction to IEEE1588 timing packets (correction field update calculation).

The DR-TC is a distributed Transparent Clock with Ethernet interfaces on the edges and one or more wireless links (e.g., MW/mmW links) interconnecting them. In some embodiments, on the edges the DR-TC time-stamps the ingress PTP timing packets and/or appends the timestamp data in a designated type, length value (TLV) field of the PTP timing packet.

In one example, the timestamp data represents the acquired packet timestamp corrected with the time offset value measured in a direction towards the remote MW link partner.

The local to remote offset may be the time difference between two independently synchronized (e.g., SyncE) counters running on both sides of the radio link. Correction of the acquired timestamp therefore represents a transformation of the captured timestamp in the time domain of the remote radio link partner. Further traversing of PTP timing packets over microwave nodes of DR-TC does not involve additional packet time-stamping on subsequent nodes. Instead of packet time-stamping at each subsequent node, the DR-TC may update the time-stamp data inside the designated TLV with the time offset value measured in a direction toward remote MW link partner.

This process may be repeated on all intermediate microwave nodes. On the egress, the DR-TC again time-stamps the timing packets (e.g., PTP timing packets) and calculates the resident time based on the acquired egress packet timestamp and the time-stamp data from the designated TLV. The DR-TC further performs the final timing packet (e.g., PTP) correction field update with the calculated resident time and removes the appended TLV. Example DR-TC calculations are shown herein where the remote offset is input data for the DR-TC processing.

In various embodiments, to overcome one or more of the above-mentioned MAC level key disadvantages of microwave PHY, a Distributed Radio Transparent Clock may enable accurate time transport over microwave links using (e.g., leveraging) aspects of the widely adopted IEEE 1588 protocol.

At least one aspect of the developed DR-TC is the use of accurate timing information obtained at the PHY layer of the microwave radio interface for the calculation of the required correction to the IEEE1588 timing packets (Correction field update calculation).

The timestamp data represents the acquired packet timestamp corrected with the time offset value measured in a direction towards the remote MW link partner. The local to remote offset may be the time difference between two independently synchronized (SyncE assumed) counters running on both sides of the radio link. Correction of the acquired timestamp therefore represents a transformation of the captured timestamp in the time domain of the remote radio link partner.

Further traversing of PTP timing packets over MW nodes of DR-TC does not involve additional packet time-stamping on subsequent nodes. Instead of packet time-stamping at each subsequent node, the DR-TC may update the time-stamp data inside the designated TLV with the time offset value measured in a direction toward remote MW link partner. This process may be repeated on all intermediate MW nodes (see equation [2] below). On the egress, the DR-TC again may time-stamp the PTP timing packets and calculates the resident time based on the acquired egress packet timestamp and the time-stamp data from the designated TLV (see equation [3] below). The DR-TC further performs the final PTP correction field update with the calculated resident time and removes the appended TLV. The required DR-TC calculations are show in equations 1-3. In some embodiments, it may be assumed that the remote offset is an input data for the DR-TC processing.

$$\Delta T_{resident} = TS_{out} - TS_{in} \Delta T_{resident} = TS_{out} - TS_{in} \quad [1]$$

$$\Delta T_{resident} = TS_{out} - (TS_{in} + \Sigma_{i=1}^{N} \text{off}_{TC_{i+1}}) \quad [2]$$

$$CF_{new} = CF_{old} + \Delta T_{resident} \quad [3]$$

In various embodiments, with the use of the signalization and data channel for timestamp data exchange discussed herein, a "pseudo" peer-delay measurement mechanism at the airframe level purely in hardware may be implemented. In one example, the mechanism may enable acquisition of four timestamps required to calculate the airframe propagation delay and time offset between the local and remote radio PHYs.

In some embodiments, software control may be used to acquire all four timestamps. The software may be responsible for triggering the timestamping mechanism, collecting the acquired timestamp data and calculating airframe propagation delay and time offset between the local and remote sides. Additionally, the software may also responsible for the link asymmetry compensation.

The PHY asymmetry and PHY components contributing to the asymmetry varies based on what level of the PHY the timing signals may be accessed. In this example, the time-stamping point may be placed at the level where the airframe is assembled and disassembled (e.g., framer). At this point the FEC blocks, modulator, and demodulator blocks and all DSP blocks may be enveloped by timestamp boundaries. In some embodiments, the transmit and receive PHY latencies are both dependent upon the given modulation scheme. The components contributing to the asymmetry may be the transmitting and receiving FIFO depths and latency through the modulator/demodulator, all dependent upon modulation.

The receive FIFO depth may be additionally dependent on the respective link acquisition while the transmit FIFO depth may be additionally changed every time the transmitter chain is reinitialized. Both FIFO levels may be provided by the modem itself. Based on FIFO levels, the software may calculate the link asymmetry. With the calculated asymmetry, the software may then further improve the accuracy of the previously calculated airframe propagation delay and time offset between radio link partners. All four airframe timestamps along with the FIFO levels and PHY latencies (e.g., measured with an FPGA) provided to the software may produce the time offset between the radio link partners which may be compensated for estimated PHY asymmetry. In one example, measured PHY asymmetry in case of BCM85620 ranges from few tens of ns to few μs. This clearly shows that without explicit knowledge about PHY latencies even the timing signals, accessed at the PHY level, on their own cannot satisfy requirements for precise synchronization. The asymmetry compensated time offset may be additionally filtered with a low pass filter and averaged (e.g., using a simple moving average). Filtering and averaging are needed to suppress spikes originated from the timestamping granularity of 8 ns and the clock domain crossing between the AF timestamping unit and the AF preamble signal. The final filtered time offset may then taken by a Network Processor (NP) where the PTP protocol level of the novel DR-TC functionality may be implemented.

Figure 9:
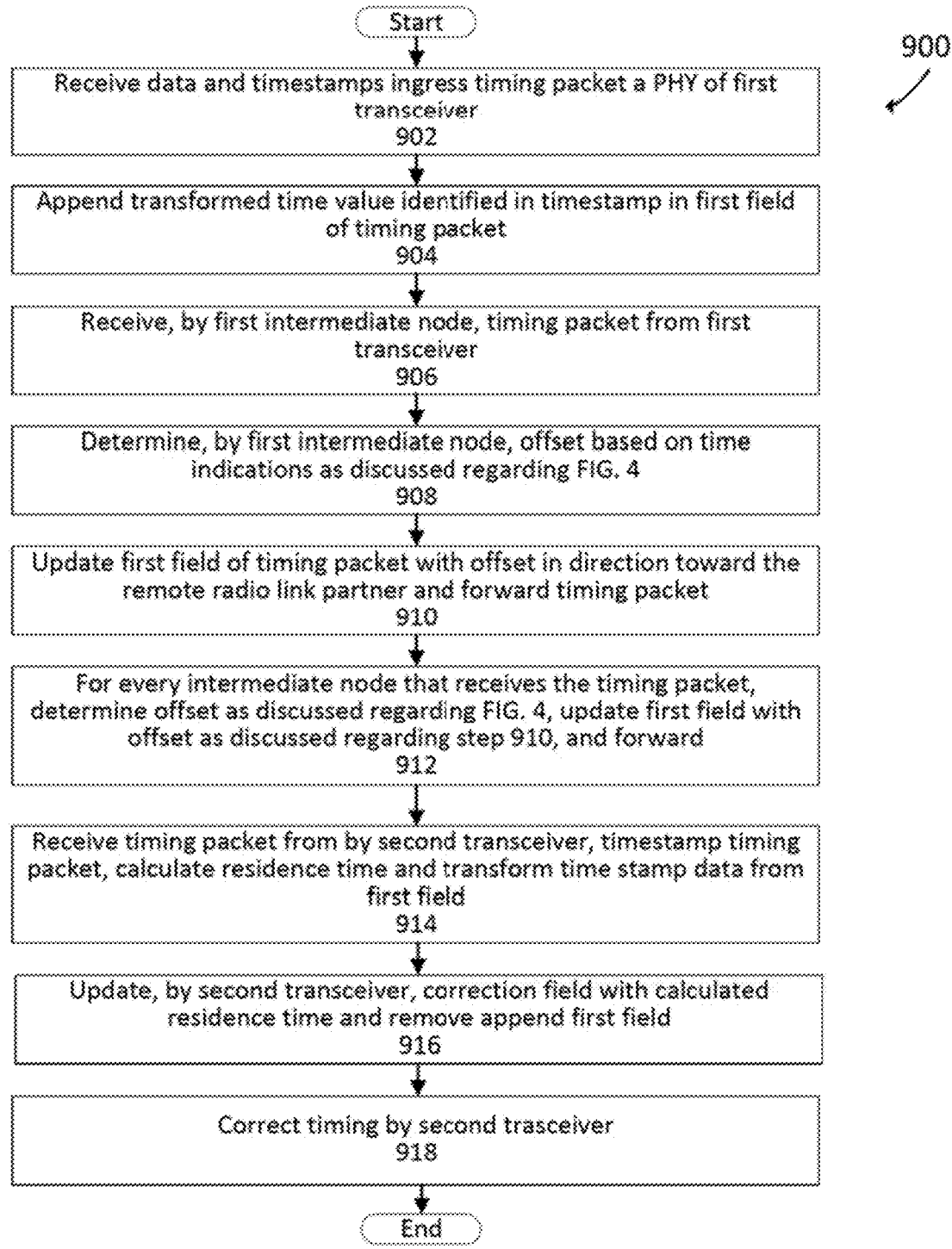
FIG. 9 depicts a flowchart for a distributed radio transparent clock across nodes within a wireless network in some embodiments.
Figure 10:
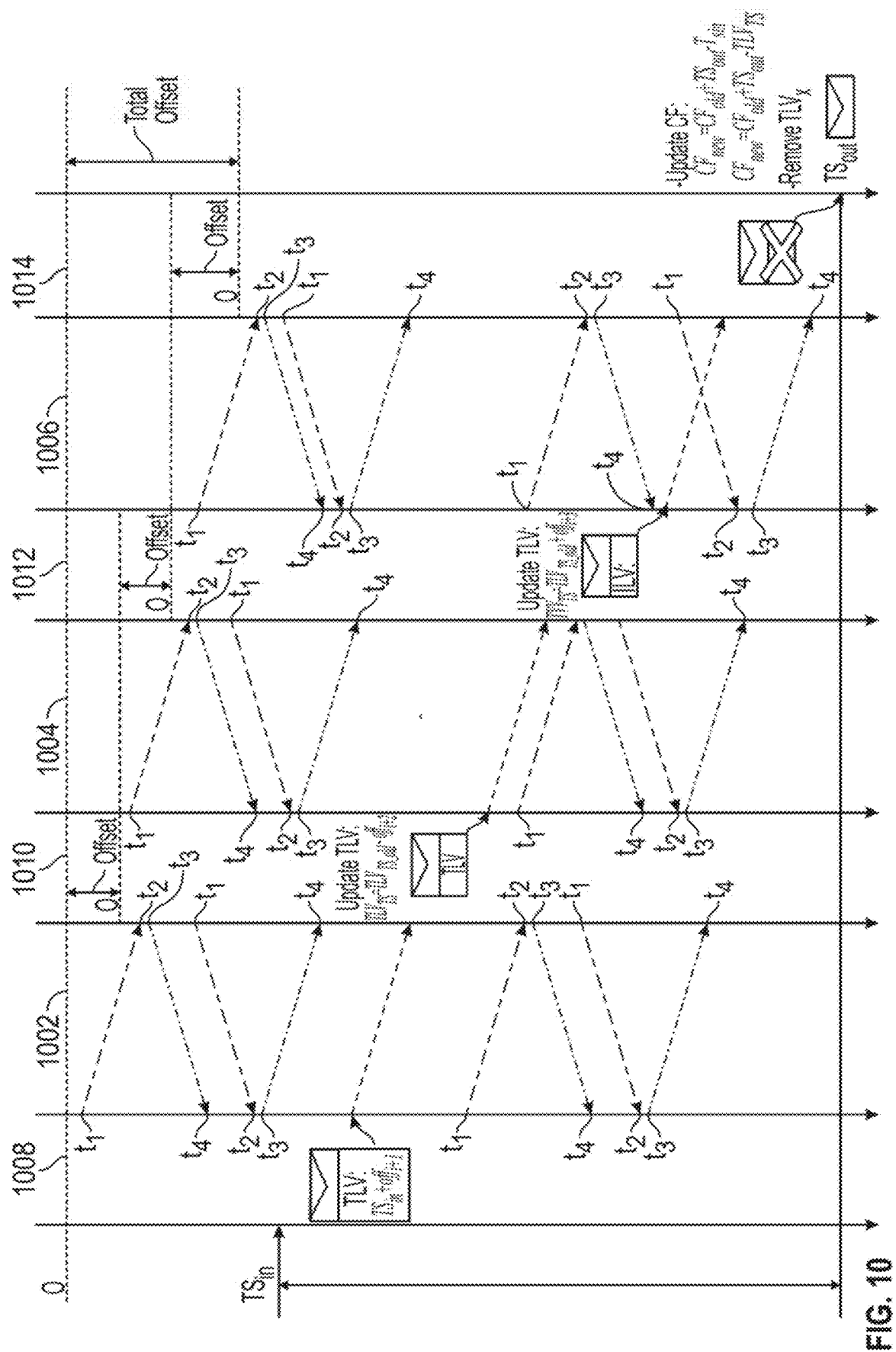
FIG. 10 depicts an example offset accumulation technique

FIG. 9 depicts a flowchart for a distributed radio transparent clock across nodes within a wireless network in some embodiments. FIG. 10 depicts an example offset accumulation technique. In various embodiments, a distributed PTP Transparent Clock implementation that encapsulates a microwave link or a chain of microwave links and forms a PTP Transparent clock between the Ethernet interfaces on the edges. FIG. 10 depicts first transceiver 1008 in wireless communication with the second transceiver 1014 over wireless links 1002, 1004, and 1006 via intermediate nodes 1010 and 1012. The intermediate nodes may include one or more transceivers. The intermediate nodes are any devices (e.g., including memory and a processor) capable of receiving and relaying information across wireless links.

As discussed regarding FIG. 4, each transceiver and intermediate node may determine or assist in determining an offset within a wireless link between itself and another device. Similarly, each transceiver and intermediate node may determine or assist in determining asynchronous performance within a wireless link between itself and another device which may be utilized to assist in determining one or more offsets.

The DR-TC exploits the previously discussed mechanism of airframe timestamping that results in a calculated time offset between the local and remote sides of the radio link. The DR-TC additionally may exploit the offset accumulation technique described herein and the PHY layer frequency transport by means of SyncE.

In some embodiments, the high level principle of DR-TC is to transport time protocol (e.g., PTP) packet timestamps from one edge to another edge across a frequency synchronized (e.g., SyncE) microwave system where the microwave system (chain of DR-TC nodes) may not be phase or time aligned. The phase/time on every microwave DR-TC node may be arbitrary and uncorrelated with other nodes. The DR-TC may transform ingress timestamps from an Ethernet interface on one edge into a time domain of egress time-stamps on the Ethernet interface on the other edge. The timestamp transformation from one edge to the other along the chain of DR-TC nodes may be performed partially on every intermediate DR-TC node. The end-to-end transformation of the ingress timestamps into a time domain of egress timestamps may be achieved by accumulating partial transformations; this is the accumulation (summation) of individual time offsets calculated between radio link partners on every DR-TC node along the chain. The end DR-TC node uses this transformed ingress timestamp along with its egress timestamp to calculate the packet residence time.

From the time protocol (e.g., PTP) packet perspective, the DR-TC time stamps the ingress timing packets on one edge and appends the transformed timestamp in a designated TLV of a timing (e.g., PTP) packet. While PTP packets are discussed herein, it will be appreciated that any time protocol packet may be utilized.

Further, although packets are described herein, it will be appreciated that any time protocol airframe or other container for providing data across the wireless link(s) may be utilized.

In one example, the first transceiver 1008 timestamps (e.g., provides time indicating in timestamp or time) ingress timing packets at a PHY (e.g., PHY 306 of microwave link partner 302) in step 902. In step 904, the first transceiver 1008 appends the transformed timestamp in a TLV field of the timing packet. Although the TLV field is described herein, it will be appreciated that any field may be utilized.

Here the transformed timestamp may represent the acquired packet timestamp corrected with the time offset value measured in a direction towards the remote radio link partner (DR-TC 2 or second transceiver 1018).

$$TS_{TLV}[1]=TS_{in}+\text{off}_{TC_2} \quad (1)$$

In step 906, an intermediate node may receive a timing packet.

In step 908, the intermediate node may determine an offset. In some embodiments, the intermediate node 1010 may receive the timing packet and may determine an offset using the method described regarding FIG. 4 for determining an offset. For example, the intermediate node 1010 may receive a request packet including an indication of a first time (TS1) the request packet was sent from the first transceiver 1008, determine an indication of a second time (TS2) when the request packet was received, generate a respond packet, determine an indication of a third time (TS3) when the respond packet is sent to the first transceiver 1008, request time data from the first transceiver 1008, receive a response including at least an indication of a fourth time (TS4), and determine an offset using TS1, TS2, TS3, and TS4 (and/or asynchronous network performance) as discussed herein.

To continue the discussion in the context of FIG. 10, the intermediate node 1012 may receive the timing packet from intermediate node 1010 and may determine an offset using the method described regarding FIG. 4 for determining an offset. For example, the intermediate node 1012 may receive a request packet including an indication of a first time (TS1) the request packet was sent from the intermediate node 1010, determine an indication of a second time (TS2) when the request packet was received, generate a respond packet, determine an indication of a third time (TS3) when the respond packet is sent to the intermediate node 1010, request time data from the intermediate node 1010, receive a response including at least an indication of a fourth time (TS4), and determine an offset using TS1, TS2, TS3, and TS4 (and/or asynchronous network performance) as discussed herein.

Further traversing of timing packets over radio nodes of the DR-TC does not involve additional packet time stamping on subsequent nodes. Instead, at each subsequent node (e.g., node 1010 and 1012, the DR-TC (e.g., each node 1010 and 1012) updates (add to the previous sum) the time-stamp data inside the designated TLV with the time offset value measured in a direction toward remote radio link partner in step 910.

$$TS_{TLV}[i]=TS_{TLV}[i-1]+\text{off}_{TC_{i+1}} \quad (2)$$

This process is repeated on all intermediate radio nodes 912. For N DR-TC nodes, the end-to-end $TS_{TLV}$ transformation is as follows:

$$TS_{TLV}[N]=TS_{in}+\Sigma_{i=1}^{N-1}\text{off}_{TC_{i+1}}$$

On timing packet egress, the DR-TC (e.g., the second transceiver 1014 or target node) again time-stamps the PTP timing packets and calculates the residence time $\Delta T_{res}$ based on the acquired egress PTP packet timestamp $TS_{out}$ and transformed time-stamp data $TS_{TLV}$ from the designated TLV in step 914. In various embodiments, the second transceiver 1014 may determine an offset based on time indications between itself and the last node in communication with the second transceiver 1014 (e.g., intermediate node 1012). The offset may be added or combined with the value(s) in the TLV and used to assist in calculating equation 3.

$$\Delta T_{res}=TS_{out}-TS_{TLV} \quad (3)$$

The DR-TC at the end point performs the final step; updates PTP correction field with the calculated residence time in step 916, see equation (4), and removes appended TLV.

$$CF_{new}=CF_{old}+\Delta T_{res} \quad (4)$$

In various embodiments, the second transceiver may update a counter or clock using the result from equation (4). Similarly, intermediate nodes may update their counter, clock, and/or phase using the offset information and possibly information from the TLV field (as well as information regarding asynchronous behavior in any or all of the wireless links). Further, the second transceiver may update its phase based on an offset determined between the second transceiver and the last intermediate node that provided data directly to the second transceiver.

It will be appreciated that microwave is the most dominant technology globally for building high capacity backhaul to support mobile networks. In some embodiments, the concept of DR-TC may enable seamless phase/time synchronization transport over microwave networks with nanosecond accuracy. Discussed herein are example offset accumulation technique employed as part of the DR-TC concept, which additionally removes the need for prior phase/time alignment of the whole microwave system. This means that there is no need to run and build any kind of Master-Slave hierarchy for phase/time transportation across the whole microwave system. Instead, peer offset between every radio link partner may be continuously measured and monitored on every DR-TC node, similar to the PTP peer delay mechanism. This means that the DR-TC is "transparent" to the actual PTP Master-Slave direction. As a result, the DR-TC is able to quickly adapt after path reconfiguration which is especially important in complex topologies like rings or partial mesh.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A method comprising:
   receiving, by a first transceiver, a timing packet over an ethernet connection;
   timestamping, by a first physical layer of the first transceiver, the timing packet;
   providing, by the first transceiver, the timing packet to a first intermediate node;
   receiving, by the first intermediate node, the timing packet from the first transceiver;

determining a first offset between the first intermediate node and the first transceiver;

updating a first field within the timing packet with the first offset between the first intermediate node and the first transceiver;

receiving the timing packet by a second transceiver, the timing packet including the first field, information within the first field being at least based on the first offset;

determining a second offset between the second transceiver and an intermediate node that provided the timing packet to the second transceiver; and correcting a time of the second transceiver based on the second offset and the information within the first field.

2. The method of claim 1, wherein determining the first offset between the first intermediate node and the first transceiver comprises:

receiving, at the first intermediate node, a request airframe from the first transceiver, the request airframe including a first timestamp indicating a first time T1 that the request airframe was transmitted from the first transceiver, the first transceiver and the first intermediate node including first and second counters, respectively;

timestamping, by the first intermediate node, a second time indication indicating a second time T2 that the request airframe was received;

generating a respond airframe and including within the respond airframe a third time indication indicating a third time T3 that the respond airframe is being transmitted to the first transceiver;

transmitting the respond airframe to the first transceiver;

providing, by the first intermediate node, a timestamp information request to the first transceiver;

receiving a timestamp information response, from the first transceiver, in response to the timestamp information request, the timestamp information response including a fourth time indication indicating a fourth time T4 when the respond packet was received by the first transceiver; and calculating, by the first intermediate node, the first offset using the first time, the second time, the third time, and the fourth time.

3. The method of claim 2, where the first and second counters are synchronized with each other before the first offset is calculated.

4. The method of claim 2, wherein the first counter is a Precision Time Protocol (PTP) counter.

5. The method of claim 2, further comprising determining asymmetry (ASY) in a wireless link between the first transceiver and the first intermediate node, wherein calculating the first offset includes $$\frac{(TS1 + TS4 - TS3 - TS2)}{2} \pm \frac{Asy}{2}.$$

6. The method of claim 2, further comprising:

providing the timing packet by the first intermediate node to a second intermediate node;

receiving, at the second intermediate node, a request airframe from the first intermediate node, the request airframe including a first timestamp indicating a first time T5 that the request airframe was transmitted from the first intermediate node;

timestamping, by the second intermediate node, a second time indication indicating a second time T6 that the request airframe was received;

generating a respond airframe and including within the respond airframe a third time indication indicating a third time T7 that the respond airframe is being transmitted to the first intermediate node;

transmitting the respond airframe to the first intermediate node;

providing, by the second intermediate node, a timestamp information request to the first intermediate node;

receiving a timestamp information response, from the first intermediate node, in response to the timestamp information request, the timestamp information response including a fourth time indication indicating a fourth time T8 when the respond packet was received by the first intermediate node;

calculating, by the second intermediate node, a third offset using the first time, the second time, the third time, and the fourth time; and updating the first field within the timing packet with the third offset between the second intermediate node and the first intermediate node.

7. The method of claim 6, wherein the second intermediate node is the intermediate node that provided the timing packet to the second transceiver.

8. The method of claim 7, further comprising determining asymmetry (ASY) in a wireless link between the second transceiver and the intermediate node that provided the timing packet to the second transceiver, wherein calculating the third offset includes $$\frac{(TS5 + TS6 - TS7 - TS8)}{2} \pm \frac{Asy}{2}.$$

9. The method of claim 1, wherein the first transceiver and the second transceiver have synchronized frequencies.

10. The method of claim 1, wherein the updating the first field within the timing packet with the first offset between the first intermediate node and the first transceiver is $TS_{TLV}[i]=TS_{TLV}[i-1]+off_{TC_{i+1}}$ wherein the first field is a TLV, TS is a timestamp, and off is the first offset.

11. The method of claim 10, further comprising the first transceiver updating the first field as follows: $TS_{TLV}[1]=TS_{in}+off_{TC_2}$.

12. The method of claim 11, wherein the second transceiver calculates a residence time based on a time of the timing packet calculated at a physical layer of the second transceiver and the information of the first field, as follows: $\Delta T_{res}=TS_{out}-TS_{TLV}$.

13. The method of claim 12, wherein the second transceiver updates a clock based on the residence time as follows: $\Delta T_{res}=TS_{out}-TS_{TLV}$.

14. A system comprising:

a first transceiver configured to receive, by a first physical layer, a timing packet over an ethernet connection and configured to timestamp the timing packet;

a first intermediate node configured to receive the timing packet from the first transceiver, determine a first offset between the first intermediate node and the first transceiver, and update a first field within the timing packet with the first offset between the first intermediate node and the first transceiver; and a second transceiver configured to receive the timing packet, the timing packet including the first field, information within the first field being at least based on the first offset, configured to determine a second offset between the second transceiver and an intermediate node that provided the timing packet to the second transceiver, and configured to correct a time of the second transceiver based on the second offset and the information within the first field.

15. The system of claim 14, wherein the first intermediate node configured to determine the first offset between the first intermediate node and the first transceiver comprises the first intermediate node configured to receive a request airframe from the first transceiver, the request airframe including a first timestamp indicating a first time T1 that the request airframe was transmitted from the first transceiver, timestamp a second time indication indicating a second time T2 that the request airframe was received, generate a respond airframe and include within the respond airframe a third time indication indicating a third time T3 that the respond airframe is being transmitted to the first transceiver, transmit the respond airframe to the first transceiver, provide a timestamp information request to the first transceiver, receive a timestamp information response, from the first transceiver, in response to the timestamp information request, the timestamp information response including a fourth time indication indicating a fourth time T4 when the respond packet was received by the first transceiver, and calculate, by the first intermediate node, the first offset using the first time, the second time, the third time, and the fourth time.

16. The system of claim 15, the first intermediate node being further configured to assist to determine asymmetry (ASY) in a wireless link between the first transceiver and the first intermediate node and to calculate the first offset using $$\frac{(TS1 + TS4 - TS3 - TS2)}{2} \pm \frac{Asy}{2}.$$

17. The system of claim 15, further comprising a second intermediate node, the second intermediate node configured to receive the timing packet from the first intermediate node, receive a request airframe from the first intermediate node, the request airframe including a first timestamp indicating a first time T5 that the request airframe was transmitted from the first intermediate node, timestamp a second time indication indicating a second time T6 that the request airframe was received, generate a respond airframe and include within the respond airframe a third time indication indicating a third time T7 that the respond airframe is being transmitted to the first intermediate node, transmit the respond airframe to the first intermediate node, provide a timestamp information request to the first intermediate node, receive a timestamp information response, from the first intermediate node, in response to the timestamp information request, the timestamp information response including a fourth time indication indicating a fourth time T8 when the respond packet was received by the first intermediate node, calculate a third offset using the first time, the second time, the third time, and the fourth time as follows:

$$\text{third offset} = \frac{(TS5 + TS6 - TS7 - TS8)}{2},$$

and update the first field within the timing packet with the third offset between the second intermediate node and the first intermediate node.

18. The system of claim 17, wherein the second intermediate node is the intermediate node that provided the timing packet to the second transceiver.

19. The system of claim 18, wherein the second intermediate node is further configured to assist to determine asymmetry (ASY) in a wireless link between the second transceiver and the intermediate node that provided the timing packet to the second transceiver and to calculate the third offset using $$\frac{(TS5 + TS6 - TS7 - TS8)}{2} \pm \frac{Asy}{2}.$$

20. The system of claim 14, wherein the first intermediate node is configured to update the first field within the timing packet with the first offset between the first intermediate node and the first transceiver as $TS_{TLV}[i]=TS_{TLV}[i-1]+\text{off}_{TC_{i+1}}$ wherein the first field is a TLV, TS is a timestamp, and off is the first offset.

21. The system of claim 20, the first transceiver being further configured to update the first field as follows: $TS_{TLV}[1]=TS_{in}+\text{off}_{TC_2}$.

* * * * *